United States Patent [19]

Ryu et al.

[11] Patent Number: 5,560,012
[45] Date of Patent: Sep. 24, 1996

[54] OBJECT-ORIENTED DATA PROCESSING SYSTEM

[75] Inventors: Tadamitsu Ryu; Hiroyuki Izumi; Masahiko Murakawa; Masanobu Toyota; Takeshi Adachi, all of Kawasaki; Naomi Ichikawa, Yokohama, all of Japan

[73] Assignee: Fujitsu Limited, Kawasaki, Japan

[21] Appl. No.: 248,978

[22] Filed: May 25, 1994

[30] Foreign Application Priority Data

May 25, 1993 [JP] Japan .................. 5-122557

[51] Int. Cl.⁶ .............. G06F 17/30; G06F 7/00
[52] U.S. Cl. .............. 395/700; 395/600; 364/974.1; 364/DIG. II; 364/282.1; 364/DIG. I
[58] Field of Search .................. 395/650, 700, 395/600; 364/974.1

[56] References Cited

U.S. PATENT DOCUMENTS

| | | | |
|---|---|---|---|
| 5,175,828 | 12/1992 | Hall et al. | 395/375 |
| 5,265,206 | 11/1993 | Schackelford et al. | 395/200 |
| 5,361,350 | 11/1994 | Conner et al. | 395/600 |
| 5,421,016 | 5/1995 | Conner et al. | 395/700 |

*Primary Examiner*—Alvin E. Oberley
*Assistant Examiner*—Michael T. Richey
*Attorney, Agent, or Firm*—Staas & Halsey

[57] ABSTRACT

An object-oriented data processing system includes a link setting unit for setting a link between a plurality of composite objects to provide a structure to a static model and a dynamic model such that the link includes: a strong link that causes an automatic propagation of an operation applied to a composite object, to another composite object connected by the strong link; and a weak link wherein propagation of an operation applied to a composite object occurs to another composite object connected by the weak link, conditionally.

4 Claims, 24 Drawing Sheets

OBJECT-ORIENTED DATA PROCESSING SYSTEM

BACKGROUND OF THE INVENTION

The present invention generally relates to object-oriented data processing systems, and more particularly to an object-oriented data processing system that describes the real world in terms of an object model.

In the object-oriented data processing system, the real world is grasped as an external definition and a corresponding internal definition, wherein the internal definition describes the details of the external definition. More specifically, the external definition includes iD information that identifies a corresponding internal definition, while the internal definition specified by the iD information is set in a concealed area which is concealed from outside. Thus, the real world is represented substantially by the external definitions only, in the form of object world, while the object world generally includes a dynamic world and a static world. The static world includes classes and/or composite classes, wherein the classes and the composite classes provides the structure of the system. On the other hand, the dynamic world includes instances of the foregoing classes and/or composite classes, and these instances provide the motion of the dynamic world.

First, a description will be given with respect to an advantageous point of forming a capsule of objects, by referring to FIGS. 1A through 1C.

For example, executionable process data 214 are made up of a series of instructions (or instruction groups) 250 shown in FIG. 1A which are serialized in the processing sequence. A number of such instructions (or instruction groups) 250 form a unit process 251 which executes a predetermined process or behavior.

Accordingly, the executionable process data 214 shown in FIG. 1A may be regarded as a collection of the unit processes 251 which are serialized in the processing sequence as shown in FIG. 1B. The serialized executionable process data 214 shown in FIG. 1B as a whole carry out a specific operation. Hence, the executionable process data 214 for carrying out another specific operation is given as a connection of the unit processes 251 having a different combination.

As the number of existing unit processes 251 which make different behaviors becomes large, the individual unit processes 251 are integrated under a predetermined method M as shown in FIG. 1C, so as to obtain an integrated processing group which carries out the same operation as the executionable process data 214 shown in FIG. 1B.

As a preliminary description, the relationship between object, object command and object component will be described.

First, a description will be given about the relationships between object, object command and object component.

FIG. 2 shows an example of the real world, that is, a model of company organization. Within a box representing "employee" in FIG. 2, there is a "secretary" belonging to a "work type=1," a "leader" belonging to a "work type=2," and a "worker" belonging to a "work type=3." A box representing "employee" belongs to a box representing a "team."

The "leader" is related to the "team" under the relationship "team leader." In addition, the "worker" is related to a "machine" under the relationship "worker/machine" within the box representing "work unit."

The "team" and the "machine" are related under the relationship "workshop/machine." The "worker" and the "machine" are related under the relationship "machine/worker." In addition, the "employee" and the department are related under the relationship "department/employee."

Furthermore, the "employee" and the "position" are related under the relationship "employee/attribute." The "work unit" and the "component" are related under the relationship "work unit/component."

The following relationships also exist.

(1) The "department" is related to the object "department name" and the object "dollars."
(2) The "team" is related to the object "name" by a team identification number, related to the object "employee number" by the work type, related to the object "code name" and the object "surname" by the name, related to the object "dollars" by the salary, related to the object "dollars" by the average salary, and related to the object "number" by the average number of departments.
(3) The "secretary" is related to the object "number" by the typing speed.
(4) The "position" is related to the object "name" by the name, and related to the object "year" by the age.
(5) The "part" is related to the object "part number" and the object "dollars."
(6) The "work unit/part" is related to the object "number" by the volume.
(7) The "work unit" is related to the object "time" by the required time.
(8) The "machine" is related to the object "machine number" the object "dollars" and the object "machine name."
(9) The "machine/work" is related to the object "time" by the time used.

The model shown in FIG. 2 can generally be represented as shown in FIG. 3 if the "behavior" (or method) is indicated by a circular box, the "data" is indicated by a rectangular box, and they "relationship" is indicated by a rhombic box. In other words, (1) a method "a" and data "I" are combined and function as one larger data "IV", (2) methods "b" and "c" are related to data "II" by a relationship "α" and function as one larger data "V", (3) methods "c" and "d" are related to data "III" by a relationship "β" and function as one larger data "VI", and (4) a method "e" are related to data "IV" and "V" by a relationship "τ" and function as still a larger data "VII". In other words, the behaviors (or methods) are gathered and represented as a larger group.

Each circular box, rectangular box and rhombic box shown in FIG. 3 can be treated as an individual object.

The forming of a capsule shown in FIG. 4A will now be considered for a collection of the method "a" and the data "I" shown in FIG. 3. In FIG. 4A, an opening is formed at the top of the capsule to indicate that a message communication can be made. If this opening of the capsule were closed as shown on the left side of FIG. 4B, such a capsule would then correspond to the data "IV" which is a collection of the method "a" and the data "I" in FIG. 3. If a composite object is obtained by adding a method "M" to the data "D" (capsule) shown on the left side of FIG. 4B, the data shown at the central part of FIG. 4B is obtained. Further, if a composite object is obtained by further adding a method to the data shown at the central part of FIG. 4B, the data shown on the right side of FIG. 4B is obtained. Hence, FIG. 4B shows the formation of composite objects shown in FIG. 4C by successively adding the methods.

The formation of the composite objects is not limited to that shown in FIG. 4B. For example, the composite objects may be formed as shown in FIG. 4C. In FIG. 4C, the data "D" of the object shown on the leftmost side is replaced by an object Which is made up of a method and data, as shown on the second leftmost side. In this case, a message passing is required between a method "M1" and data "D1", and the method "M1" becomes one object as shown on the second rightmost side in FIG. 4C. As a result, objects "A" and "B" exist within an object "C", and the message passing exists between the objects "A" and "B".

Furthermore, if the method "M" of the object "B" is replaced by an object "B1" and the data "D" of the object "B" is replaced by an object "B2", both the object "B1" and "B2" exist within the object "B" and the message passing exists between the objects "B1" and "B2" as shown on the rightmost side in FIG. 4C.

Therefore, the composite objects are formed by successively combining the objects. For example, the so-called primitive objects which will be described later are combined to form a capsule object, the capsule objects are combined to form an event object, and the event objects are combined to form a system object.

The data "D" described above is generally made up of a plurality of unit processes which are the subject of the processing. On the other hand, the method "M" may be considered as information or information group instructing how the plurality of unit processes are to be utilized. The objects represented in FIGS. 4A–4C represent a "unit process" which is treated as an individual "unit process" or a collection of "individual unit processes".

As shown in FIG. 3, the individual objects "I", "II" and "III" form a part of the larger objects "IV", "V" and "VI" In addition, the objects "IV", "V" and "VI" form a part of still a larger object "VII". In other words, the objects "IV", "V" and "VI" are in an "is-a" relationship or a "part-of" relationship with the object "VII" when viewed from the object "VII".

If the objects "I", "II" and "III" are regarded as minimum units, these objects "I", "II" and "III" may be said to be primitive objects. The capsule object is formed by a collection of such primitive objects. The event object is formed by! a collection of such capsule objects. Furthermore, a still larger system object is formed by a collection of such event objects.

The objects described above which are made up of a collection of smaller objects are respectively referred to as composite object. The primitive object is included in the concept of the composite object. However, the primitive object is an object of the minimum unit as described above. For this reason, when a reference is generally made to a "composite object" or an "object", it is better to exclude the primitive object which exists by itself and cannot be decomposed further.

The object in the capsule form is generally made up of the composite objects described above in the capsule form.

Thus, the real world is represented by a number of objects related with each other as indicated in FIG. 2, wherein each object represents a unit process that may or may not include a number of subunits.

As described above, it is possible to model the real world by means of objects. For example, human conversation in society implicitly assumes common sense that represents the entity of the real world. The actual conversation is usually made by using the name of the entity. Thus, the conventional object-oriented technology, which arranges the created program according to the class, also conceals the entity of the program in a storage device that forms a concealed world as indicated in FIG. 5. The entity of the program is called as needed. However, conventional object-oriented data processing system merely stores the procedural type program in the storage device.

Each of the programs stored corresponds to an object. Thus, there are attempts to grasp these objects in a composite form. Conventional approach, however, has been limited to the creation of composite object from sets, "tupples" and attributes.

FIG. 6 represents a relation about "person," wherein following aspects can be read from FIG. 6.

(i) The "set" represents a set formed of individuals such as "Mary," "John," "Dick," who are related to the , "person" by the "is-a" relationship.

(ii) The "tupple" represents a set of "name," "age," "hobby," and the like, which are related to "John" according to the "part-of" relationship.

(iii) The "attribute," on the other hand, represents , semantic data such as "habit," "race," and the like, attached to "person."

In the conventional approach, the link that connects the elements such as "person," "Mary," . . . "tennis," is fixed once a relationship is set as indicated in FIG. 6. Flexible setting up of link between the element is not possible.

Thus, there occurs a need for inheriting information between the elements such as "John," "name," "hobby," "person," which are linked in accordance with the "part-of" relationship or "is-a" relationship, upon event ignition such as "age," with a predetermined rule. Such a situation, on the other hand, may cause inheritance of information not necessary for the processing.

SUMMARY OF THE INVENTION

Accordingly, it is a general object of the present invention to provide a novel and useful object-oriented data processing system wherein the foregoing problems are eliminated.

Another and more specific object of the present invention is to provide an object-oriented data processing system that provides a versatile processing capability according to the needs of the user by means of static model and dynamic model formed of objects, wherein the objects are linked with each other by a link that includes a strong link and a weak link.

Another object of the present invention is to provide an object-oriented data processing system for performing a desired processing based Upon an object model, said object model including a plurality of objects combined with each other, each of said objects being formed of data and methods, said object-oriented data processing system comprising:

an external definition provided to each of said objects for identifying said object, said external definition including an identifier that identifies said object;

an internal definition provided to each of said objects for carrying out a procedure of said object, said internal definition including, in each of said objects, an identifier corresponding to said identifier of the same object in said external definition;

model classification means for classifying said object model, based upon said external definition, into a static model that indicates a relationship between classes, and a dynamic model that indicates the time sequential relationship between instances of said classes as a session, said session thereby providing a motion of said dynamic model;

class generation means for creating said classes by combining existing and/or newly created methods, said class including a composite class formed of a plurality of classes;

instance generation means for creating said instances in correspondence to each of said classes;

said existing and/or newly created methods, said class and/or composite class, and said session being stored in a concealed area corresponding to said internal definition as a functional model such that each of said composite object is related to said identifier;

link setting means for setting a link between said plurality of composite objects forming said static model and dynamic model to provide a structure to said static model and said dynamic model;

said link including: a strong link that causes an automatic propagation of an operation applied to a composite object, to another composite object connected by said strong link; and a weak link wherein propagation of an operation applied to a composite object occurs to another composite object connected by said weak link, conditionally;

said link setting means setting a range of propagation of operation, when executing a processing upon construction of said class and/or composite class, and/or said instance, in according to-a type of said link.

According to the present invention, it is possible to call existing objects held in the concealed world and/or newly created objects by way of an object command according to the need of the user to construct the static model and the dynamic model. Thus, the object-oriented processing system of the present invention provides a flexible processing according to the demand of the user. Further, the newly created objects can be kept for future reuse. In the present invention, unnecessary inheritance of information is restricted by using the weak link, and the flexibility of the system increases further.

Other objects and further features of the present invention will become apparent from the following detailed description when read in conjunction with the attached drawings,

DETAILED DESCRIPTION OF PREFERRED EMBODIMENTS

Figure 7:
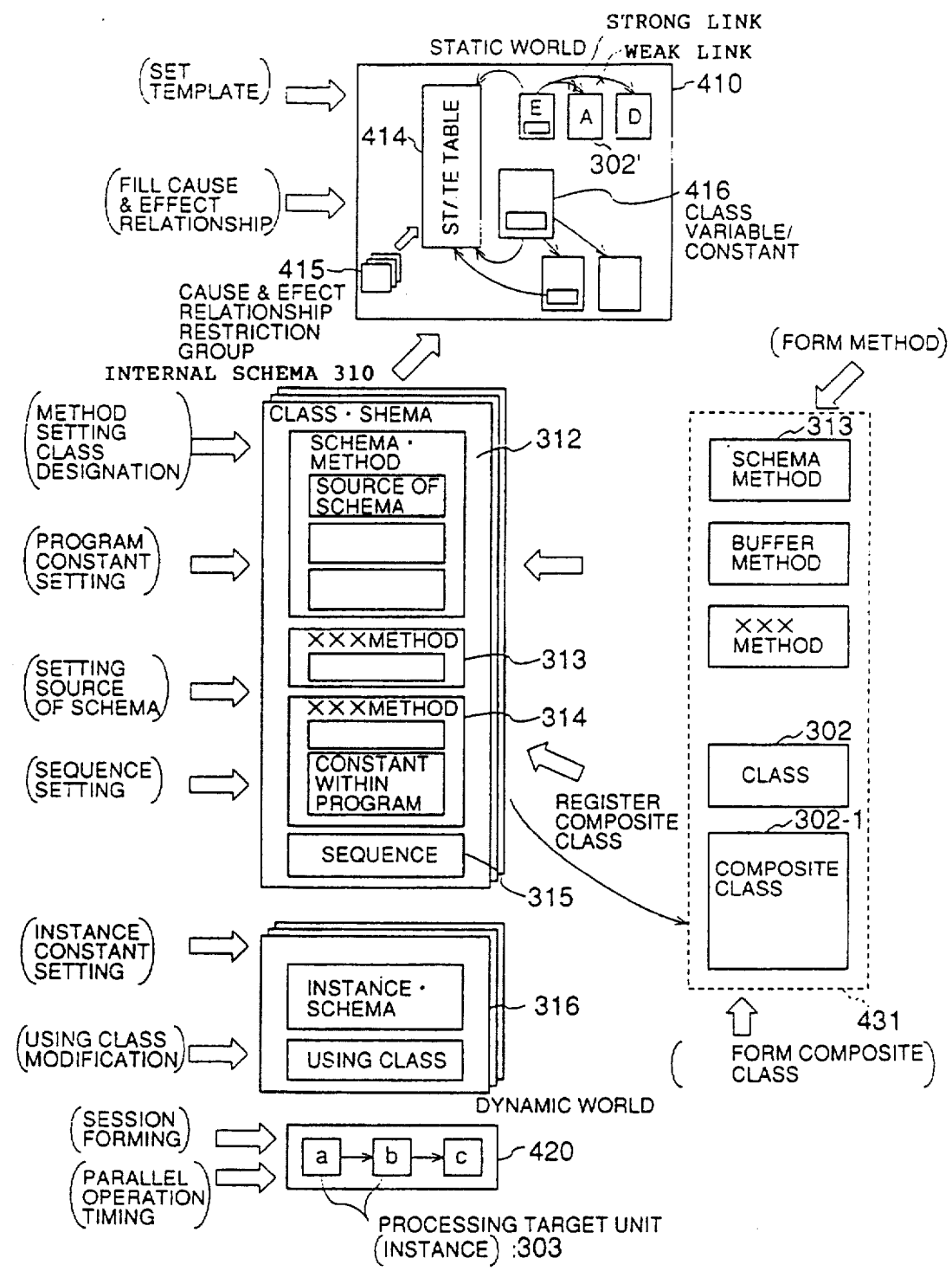
FIG. 7 is a diagram showing the principle of the present invention.

FIG. 7 shows the principle of the present invention.

Referring to FIG. 7, the system includes an internal schema 310 that creates a class or composite class in response to a new processing demand or request with a new objective or target. Further the internal schema 310 creates an instance that is related to the class or composite class thus created. Hereinafter, the term "class" may be used to indicate both the usual class and the composite class.

FIG. 7 shows a static world 410, a dynamic world 420 and a functional model 431. Thus, the system describes the real world in terms of the object model wherein the real world is described by the external definition and the internal definition such that (i) the internal definition forms a concealed area acting as a functional model 431 that stores therein existing methods 313 or classes 302. The class 302 may include newly created methods and classes. Further, the external definition is incorporated into the system in the form of the static world 410 and the dynamic world 420.

The static world 410 groups the methods 313 and the classes 302 as the class that corresponds to a new processing demand. Thus, the system for carrying out a new processing is given by combining the classes. Further, the dynamic world 420 includes the instances corresponding to the classes such that the instances are serially connected according to the order of processing, to form a session. Thus, the session provides the dynamic model for operating the system.

Further, FIG. 7 includes a class schema 312 as a functional component that creates the classes, as well as methods 313–315 that are incorporated as a constituent element of the classes for the new processing demand.

The system of FIG. 7 further includes an instance schema 316, wherein the instance schema 316 represents the functional component for creating instances corresponding to the classes, which classes in turn corresponding to the aforementioned new processing demand.

The system of FIG. 7 further includes an instance 303, a state table 414, a causality restriction group 415 also known as a cause and effect relationship restriction group, and a class variable/constant 416. Here, the state table 414 describes the hierarchical relationship between the classes that are incorporated into the system as a constituent element, the system being arranged in correspondence to the aforementioned new processing demand. Further, the state table 414 may be used to establish a link between the class variables/constants that are used in the system. The causality restriction group 415 is written into the state table 414, wherein the causality restriction group 415 describes the causality that restricts the execution of the session in the dynamic world 420 illustrated in FIG. 7. For example, the causality includes such a restriction that the instance a should be executed in advance, before executing the instance b. Thus, such a causality has to be checked when executing the session.

FIG. 7 further shows a strong link 500 and a weak link 501. The strong link 500 indicates that an inheritance of information always occurs upon an event ignition, while the weak link 501 indicates inheritance of information which occurs when it becomes necessary.

When an instruction is given to construct a system tailored to a processing demand, the classes that form the constituent element of the system are created. In order to create the classes, the name of the methods and classes that are necessary for the processing is given to the class schema 312, together with the pointer data for pointing the foregoing methods and classes. Thus, the necessary methods and classes are incorporated from the functional model 431 to the internal schema 310. In response to the creation of the foregoing classes, the instance schema 316 creates the instances that are needed for executing the classes. The instances thus created are given the relationship to the classes that use the instance.

The classes thus created are linked to the state table 414 in the dynamic world 410, and form the constituent element of the system that is tailored to the aforementioned new processing demand. The class 302' in FIG. 7 represents the class that forms the foregoing constituent element. In the dynamic world, on the other hand, the instances 303 are connected time sequentially to execute the processing of the system, and the instances 303 thus connected form a session. Thus, by executing the session, the execution of the system is achieved. In other words, the system may be set to the state ready for execution by setting up the session.

The classes and the composite classes thus created in accordance with the new processing demand, are kept as a functional model 431 for further use to construct a new system in accordance to a still new processing demand. The system of the present invention provides a flexible construction of the system, by use of the strong link and the weak link, such that the inheritance of information is achieved according to the needs, according to the situation, and according to the atmosphere that changes time to time.

Figure 8:
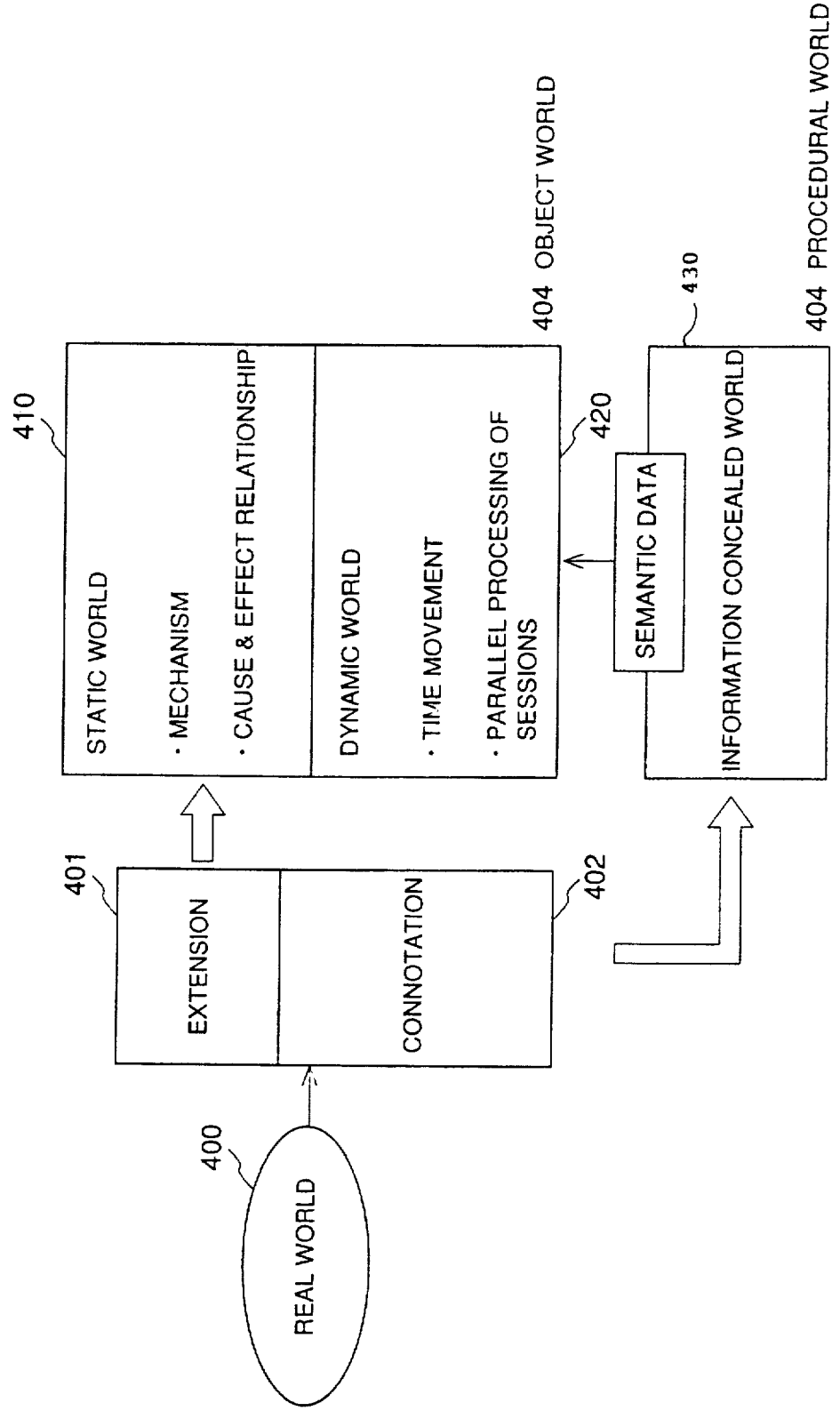
FIG. 8 is a diagram for explaining the dynamic world and the static world.
Figure 9:
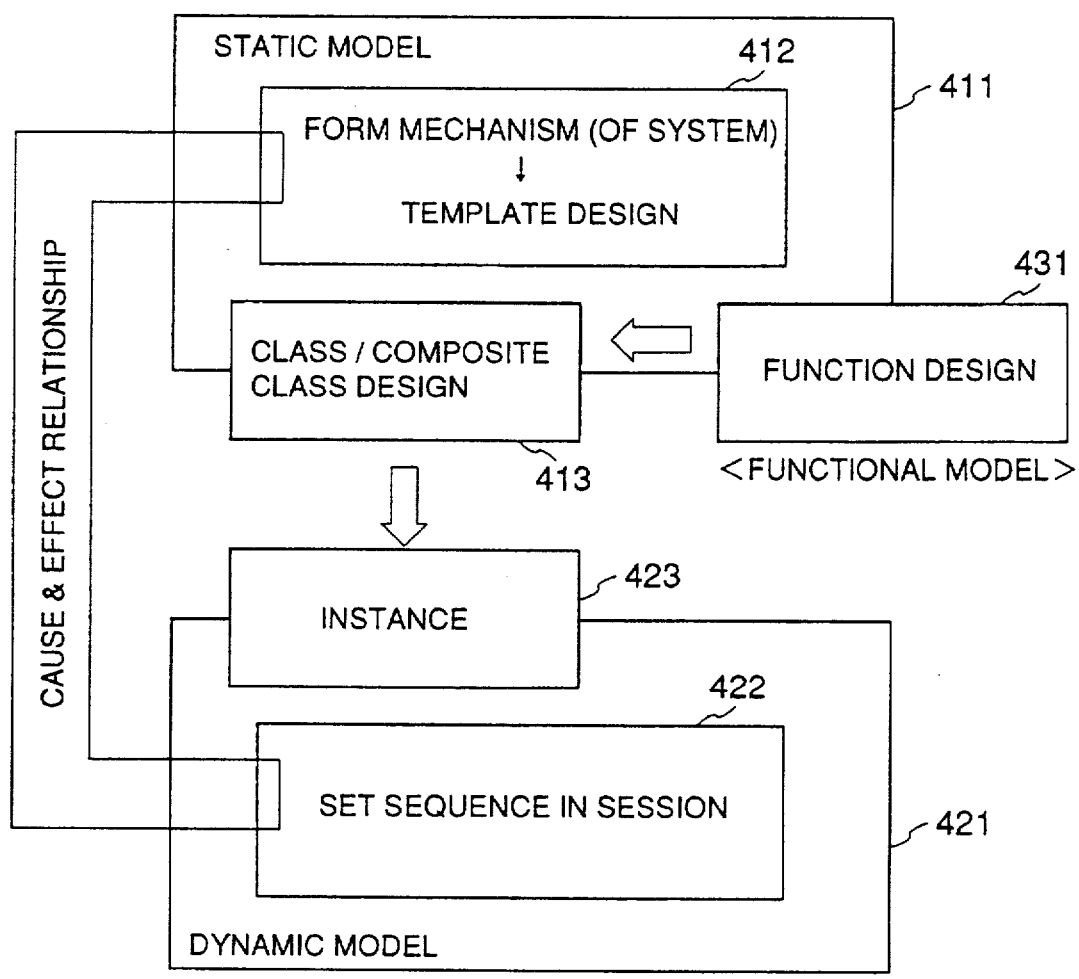
FIG. 9 is another diagram for explaining the dynamic world and the static world.

FIGS. 8 and 9 describe the static world and the dynamic world.

A real world 400 is modeled, as indicated in FIG. 8, from an internal definition 402 that provides detailed description of the real world and an external definition 401 that provides a summary or identification of the internal definition 402. Thus, one may exchange information about the real world 400 with another person or another terminal or system in terms of the external definition 401 only, provided that the content of the internal definition 402 is available to the another person or terminal. In other words, it is not necessary to provide detailed information of the real world 400 to the other side. Only the name or designation of the real world 400 is sufficient.

FIG. 8 shows the static world and the dynamic world.

In view of the foregoing argument, it will be noted that the internal definition 402 of FIG. 8 represents the concealed area in which the information is concealed with respect to the outside. Thus, the internal definition 402 corresponds to a concealed world 430. On the other hand, the real world 400 can be modeled in terms of the static world 410 that provides the structure of the real world 400 as well as the causality within the structure, and the dynamic world 420 that represents the motion of the real world. The dynamic world 420 may further indicate whether or not the parallel processing is allowed to the plurality of sessions. These static world and the dynamic world are related to the aforementioned concealed world by the external definition 401 shown in FIG. 8.

It should be noted that the internal definition 402 belongs to the concealed world and contains the data that defines the content specified by the external definition. The real world is simulated by such an external definition that implies a meaning. Thus, the external definition forms a static model for the static world and a dynamic model for the dynamic world.

FIG. 9 shows the relationship between the static model, dynamic model and the functional model, wherein FIG. 9 shows a static model 411 that corresponds to the static world 410 of FIG. 8. Similarly, FIG. 9 shows a dynamic model 421 that corresponds to the dynamic world 420. The concealed world 430 of FIG. 8 corresponds to a functional model 431 of FIG. 9.

As a result of analysis of the system and by designing the template which describes the foregoing "is-a" or "part-of" relationship, one obtains a static model. Further, a functional design is obtained, and in correspondence to this, the class 302 shown in FIG. 7 is obtained. Such a class 302 include the composite class in which a number of classes are assembled.

The dynamic model is formed by creating an instance by substituting instance data to the foregoing class 302 and designing the time sequential relationship between the instances thus created. Further, the restriction of causality is imposed between the static model and the dynamic model.

The existing methods 313 or classes 302, as well as newly created classes, are kept as a functional model 431 for further use to construct a system according to a new processing demand. In such a process, the methods and classes forming the model 431 are combined dynamically. Hereinafter, such a dynamic object processing will be described.

Figure 10:
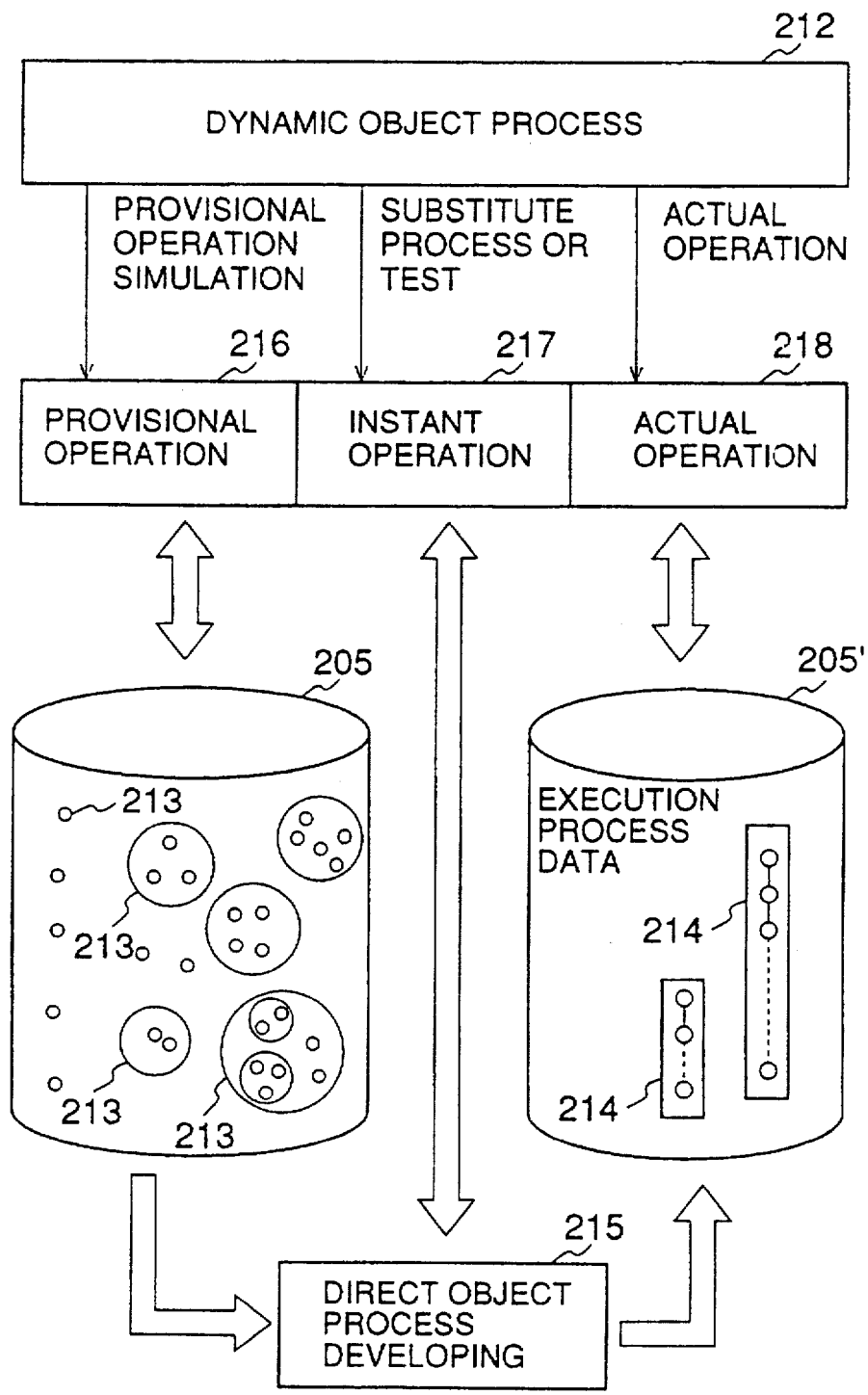
FIG. 10 is a diagram showing a part of operation of a dynamic object processing unit.

FIG. 10 is a diagram for explaining a portion of the operation of a dynamic object processing unit.

The various methods and classes described above are held in a component attribute file 205 as an object component 206 as will be described later with reference to FIG. 12. A dynamic object processing unit 212 shown in FIG. 10 carries out a process using this object component 206. Of course, it is possible to appropriately combine the object components 206 or composite object components, which is a combination of the object components 206.

The dynamic object processing unit 212 shown in FIG. 10 has a provisional operation mode 216 for carrying a simulation or the like, an instant operation mode 217 for carrying out a test or the like, and an actual operation mode 218 for carrying out a data processing or a communication process with another terminal.

Figure 12:
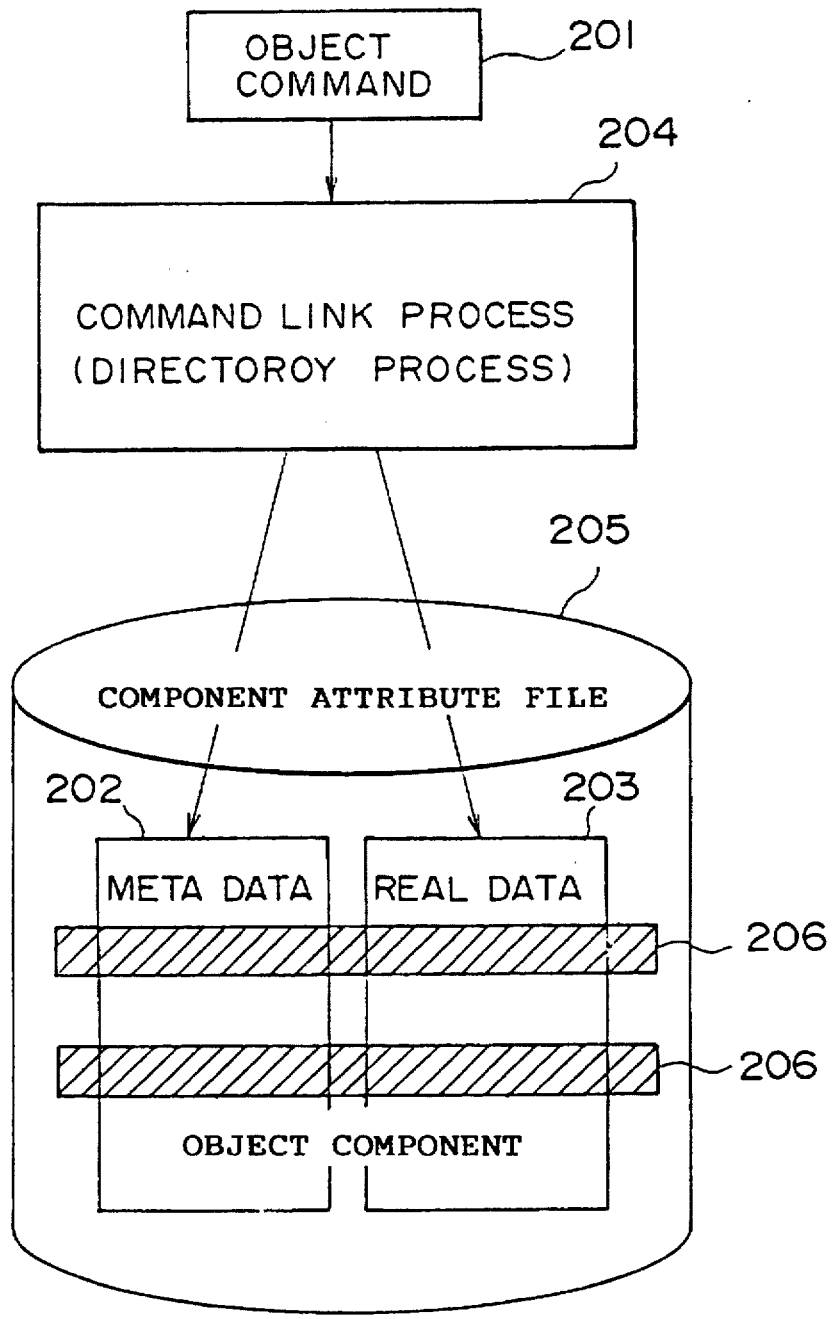
FIG. 12 is a diagram showing a mode of processing an object.

The component attribute file 205 is the same as that shown in FIG. 12. A file 205' holds executionable process data 214 which is obtained by compiling all or a portion of the content of the component attribute file 205 so as to enable high-speed execution. In the case of an object program for process execution, the executionable process data 214 in general are unit processes which are made up of several tens to several hundred steps and serially connected in the processing sequence.

The objects 213 correspond to the foregoing object 206 and may generally take the form of the primitive object as it is, the state of the capsule object, the state of the event object or the state of the system object. As described above in conjunction with FIG. 12, it may be regarded that the objects 213 are stored in the form of object components 206 and can be specified by the object commands.

A direct object process developing unit 215 carries out a process of obtaining the executionable process data 214 by expanding the individual objects 213 or, expanding a plurality of objects 213 as a whole.

Figure 1A:
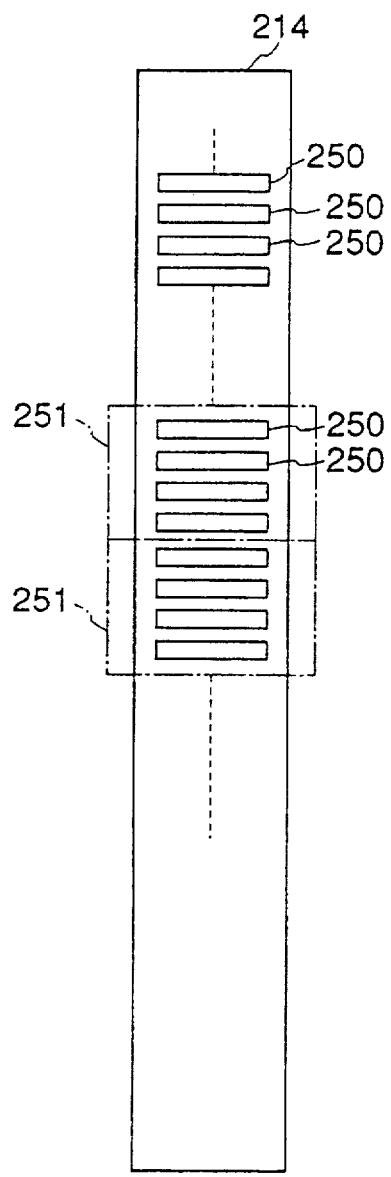
FIGS. 1A–1C are diagrams for explaining the merit of the capsuling of objects.
Figure 1B:
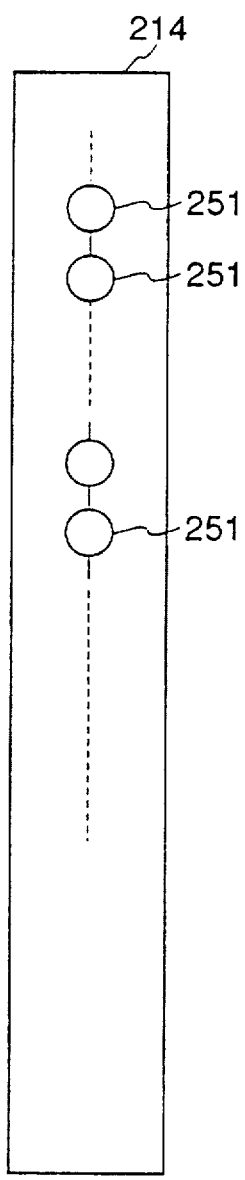
Figure 1C:
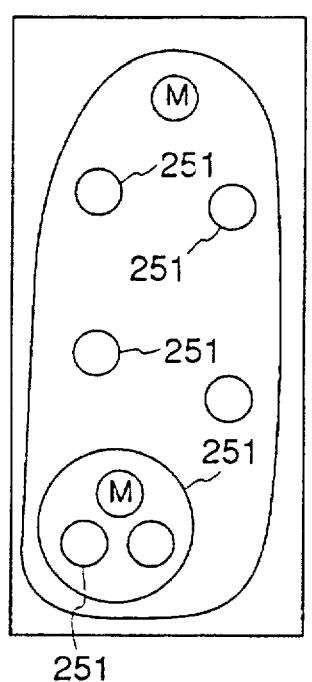
Figure 2:
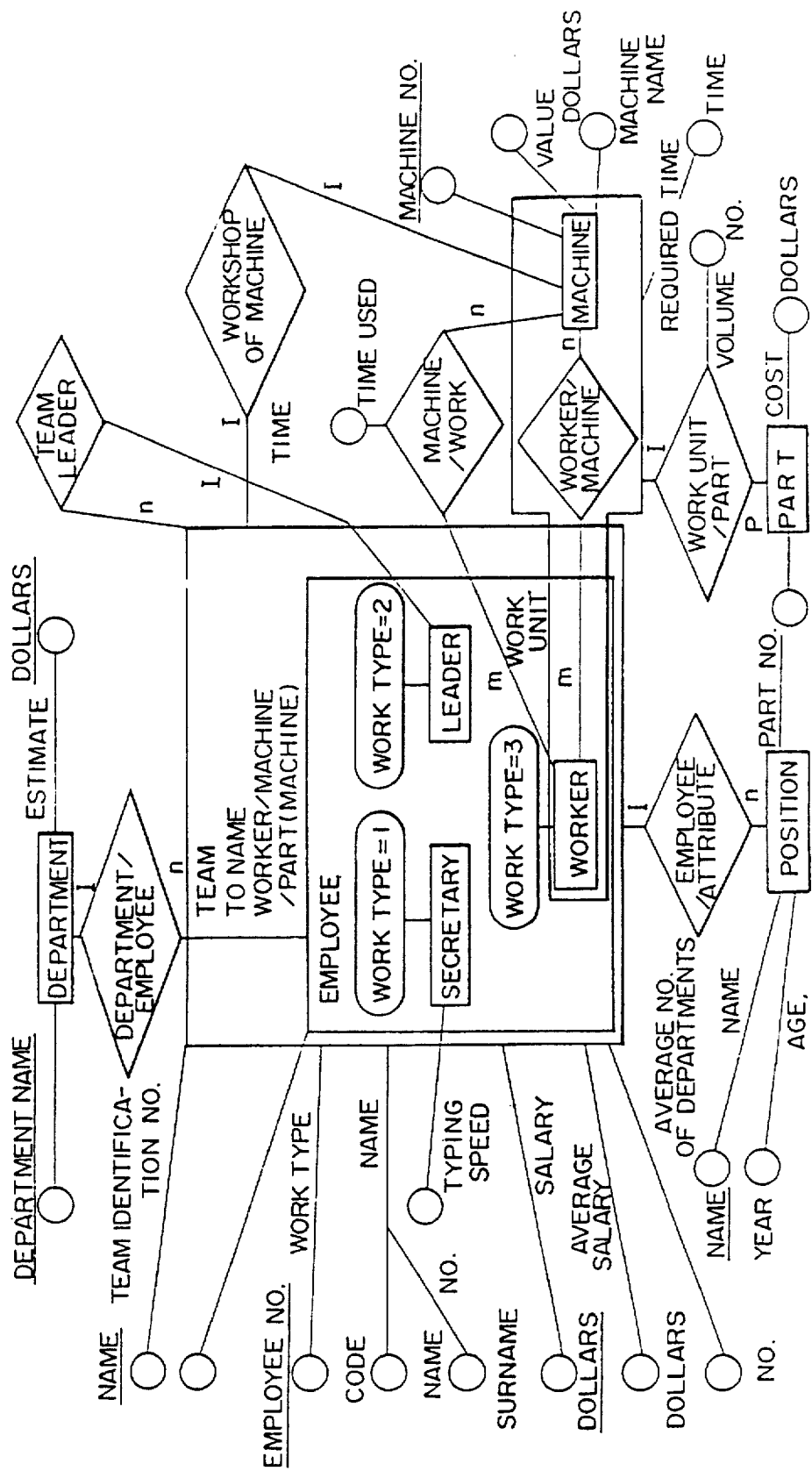
FIG. 2 is a diagram showing an example of modeling of a company organization.
Figure 3:
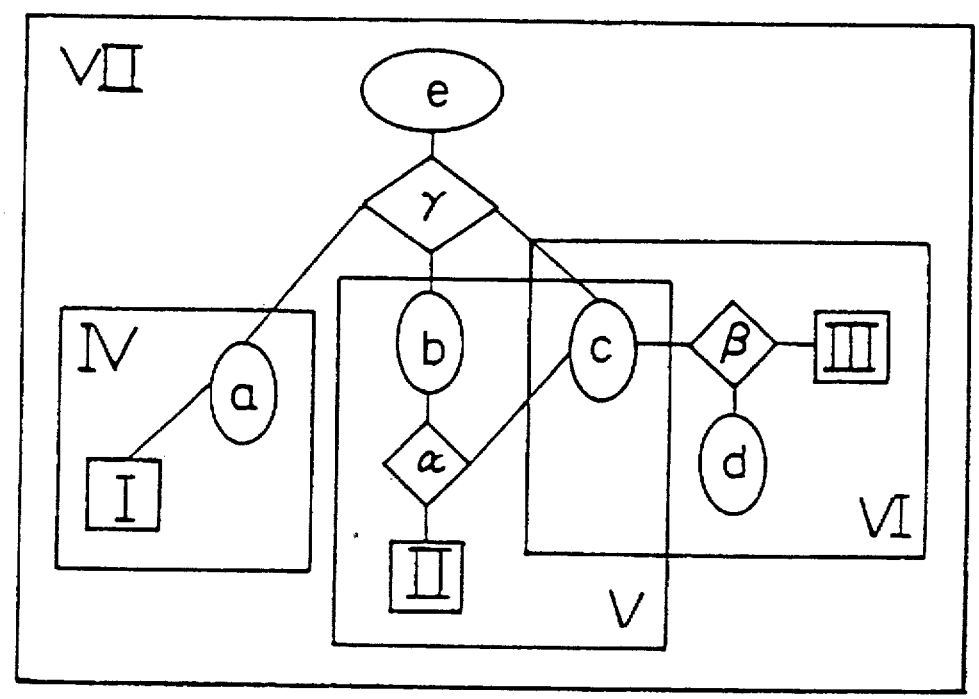
FIG. 3 is a diagram showing the abstraction of a model.

As described above with reference to FIG. 1, the objects are generally combined into objective unit processes in the form of the composite object, and becomes a unit for exhibiting a behavior for executing a process having a certain object. Such composite objects are stored in the component attribute file 205 in the form of object components 206 which are specified by the object commands 201.

When generating a new processing function, a new object is generated or the existing objects are connected depending on the objective of the processing, and the object which exhibits the new processing function is prepared as one of the object components 206, in order to enable the new processing function.

A simulation is carried out with respect to the generated object so as to determine whether or not a correct function is actually obtained, or a provisional operation is carried out with respect to the generated objects for which the simulation is ended. Such a process corresponds to the provisional operation mode 216 shown in FIG. 10. The dynamic object processing unit 212 uses the content Of the component attribute file 205 to simulate the corresponding processing operation.

Figure 11:
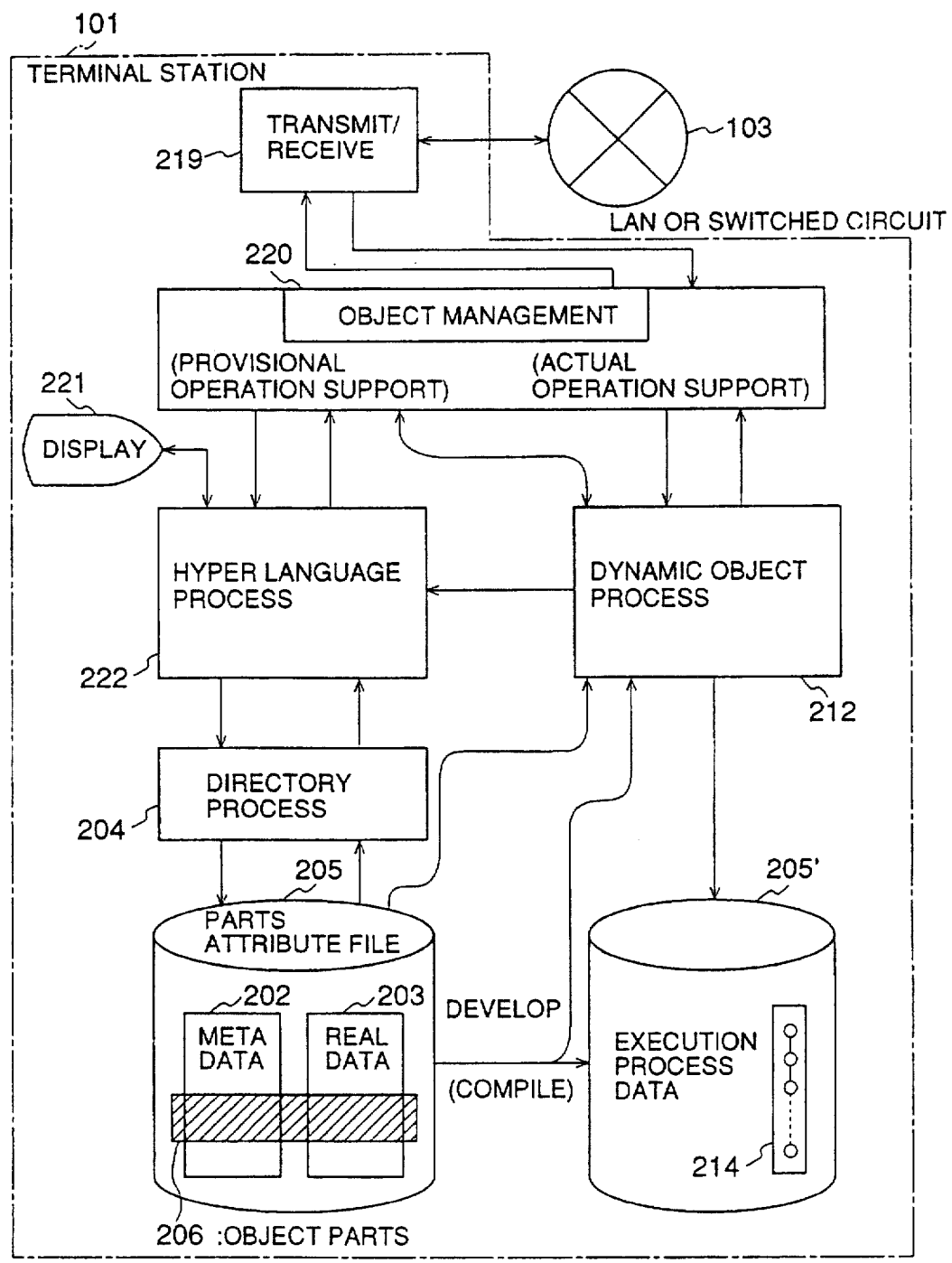
FIG. 11 is a diagram showing the construction of a terminal.

The object 213 or the object group which operates normally in the provisional operation mode 216 is expanded into the executionable process data (EXE data) 214, that is, compiled into one executionable process data 214, because the object 213 or the object group requires, in the form as it is, a large number of communications with the object management unit 220 shown in FIG. 11 and the processing speed is slowed down. This developing process is carried out in the direct object expansion unit 215 and is stored in the component attribute file 205'.

The dynamic object processing unit 212 uses the content of the component attribute file 205 and temporarily carries out a substitute process with respect to a predetermined process. On the other hand, if becomes necessary to carry out a test process, the dynamic object processing unit 212 activates the direct object process developing unit 215 to generate the executionable process data 214 and carries out this process. In FIG. 10, such a process mode is indicated as the instant operation mode 217.

The actual operation mode 218 shown in FIG. 10 is a mode for actually carrying out the process using the executionable process data 214 shown.

The semantic (meaning or significance) data related to the nature of the object is described in the metadata within the component attribute file 205. In addition, it may be regarded that the coupling relationship of a certain object with respect to the object in the upper layer (object indicated by the "is-a" relationship), the coupling relationship of the certain object with respect to the object group in the lower layer (group of objects indicated by the "part-of" relationship) and the like, are also described in the metadata within the component attribute file 205, including the aforementioned strong link 500 and the weak link 501.

FIG. 11 shows the construction of a terminal. In FIG. 11, a terminal 101 executes the process using the executionable process data 214, and communicates with another terminal via a line 103. The line 103 is a line of a local area network (LAN) or other communication network.

A transmit/receive unit 219, the object management unit 220, a display 221, a hyper language processing unit 222 and the like exist within the terminal 101.

The directory processing unit 204 shown in FIG. 11 forms a command link processing unit. When a new object is created, the directory processing unit 204 sets a command (object command) corresponding to the name of the object thus created, and allocates the address to the real data 203 and the metadata 202 by forming a command link table. In this process, the type of the object is determined together with the size. By using the command link table it becomes possible to input and output of the combination of the metadata 202 and the real data 203.

In FIG. 11, a "provisional operation support" is a support function corresponding to the operation that is carried out until the provisional operation mode 216 shown in FIG. 10 is carried out.

The hyper language processing unit 222 shown in FIG. 11 has a "component display/selection" function, and retrieves the usable object components from the display 221 and outputs the same. If no appropriate object component exists, the hyper language processing unit 222 uses a "component specify" function to specify a component as a new object component. The hyper language processing unit 222 can also generate a class object component by an "attribute set" function, and generate an instance object component by a "schema" function.

The "component display" function using the display 221 includes (i) content display of names and comments of metadata of the object components, (ii) display of schema and attribute indicating the content of the object components, and (iii) display of class attributes and instance constants.

A "component combine" function of the hyper language processing unit 222 combines the object components to obtain a larger composite object component. For this "component combine" function, there are provided a function of adding, modifying and deleting the attribute related to the formation of the classes, and a function of adding, modifying and deleting the schema related to the formation of the instance constants.

A "user screen create" function of the hyper language processing unit 222 creates the instance by inputting the screen data in the buffer of the "screen create and display" class when making the screen forming and display. For this reason, the "user screen form" function corresponds to forming the screen class into the form of the instance.

A "provisional operation" function of the hyper language processing unit 222 links the message to the method indicated by the class when the instance receives the message.

Figure 4A:
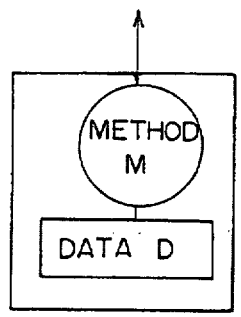
FIGS. 4A–4C are diagrams showing the examples of capsule.
Figure 4B:
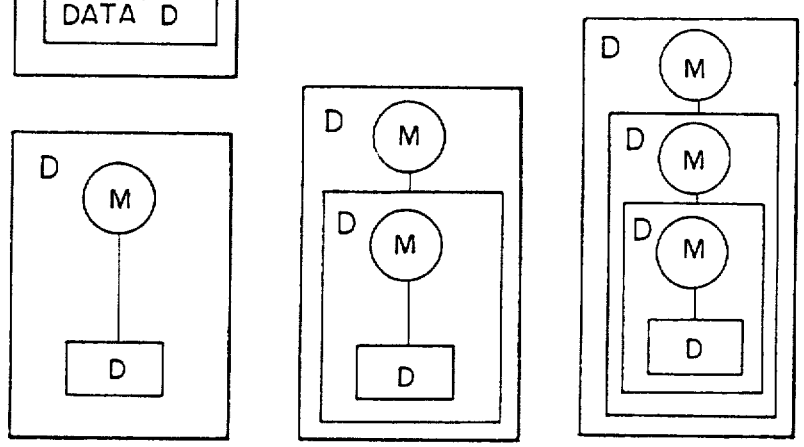
Figure 4C:
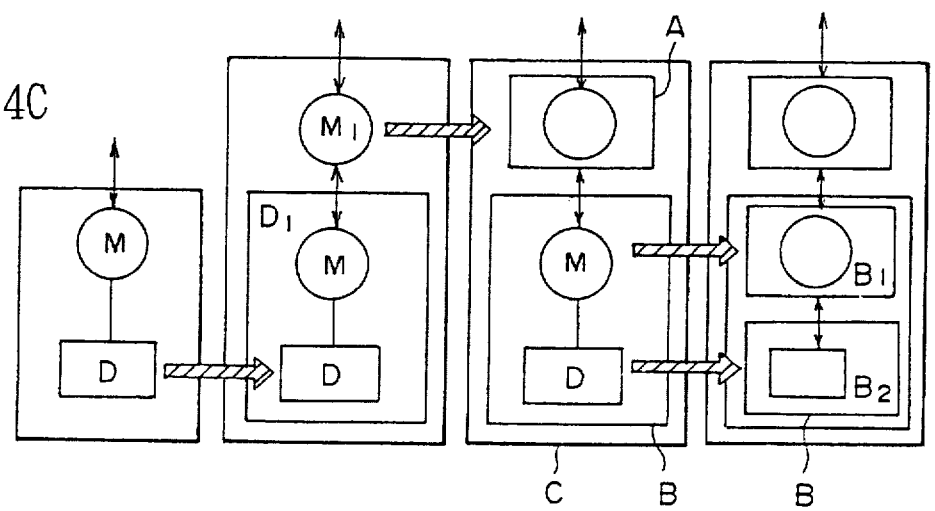
Figure 5:
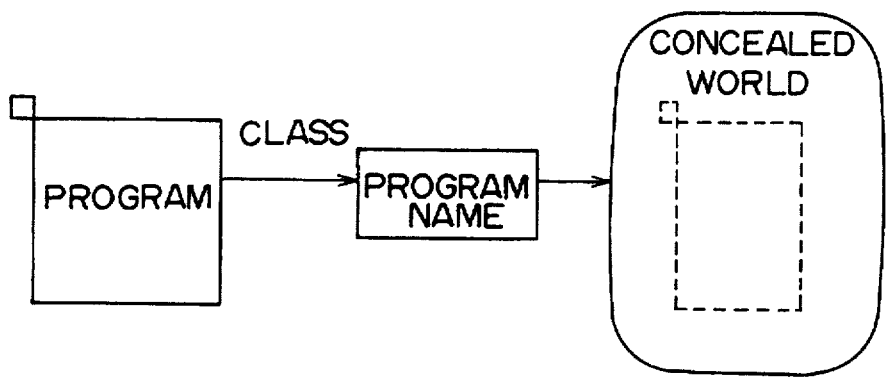
FIG. 5 is a diagram for explaining the conventional process for storing a program in the concealed world.
Figure 6:
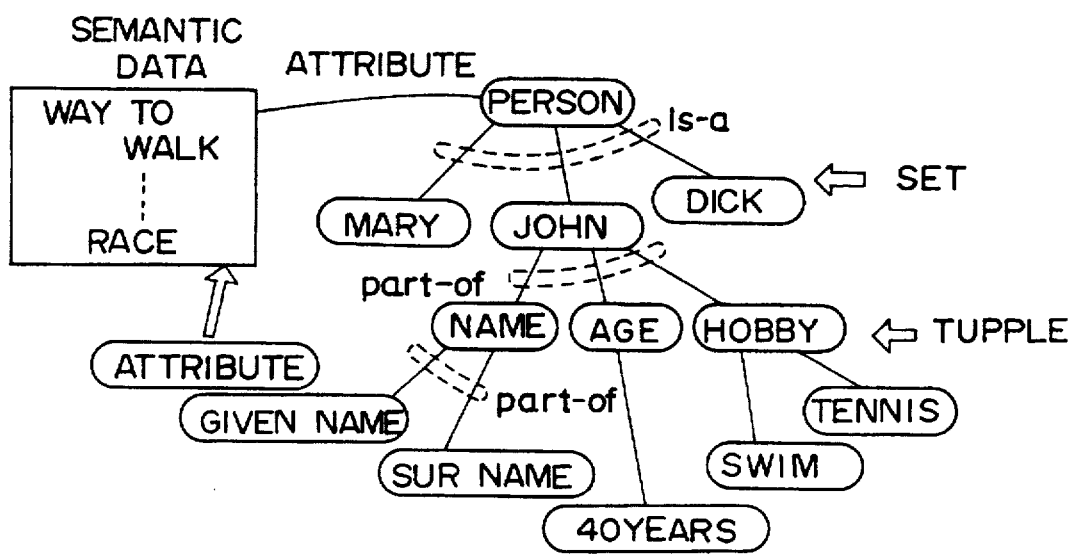
FIG. 6 is a diagram showing an example of the relation between objects.

Hence, the capsule shown in FIG. 4C is temporarily realized in a primary memory, and the behavior of the capsule is executed.

Furthermore, a "component modification" function of the hyper language processing unit 222 is a function corresponding to that of the internal schema 310 shown in FIG. 7 for modifying the object components by modifying, adding and deleting the attribute and schema. In addition, a "component register" function is a function of registering the object components in the component attribute file 205 by making the object components correspond to the object commands which are the names of the object components.

The "develop (compile)" shown in FIG. 11 indicates the direct object process developing unit 215 shown in FIG. 10. The expansion process makes an expansion to the largest possible executionable process data 214 depending on the side of the primary memory of the data processing system.

The object management unit 220 controls the hyper language processing unit 222 shown in FIG. 11 to hold the object components 206 in the component attribute file 205, and controls the dynamic object processing unit 212 to carry out the provisional operation mode 216, the instant operation mode 217 and the actual operation mode 218. In addition, the instance is activated in the provisional operation mode 216 in correspondence with the message reception via the line 103, and a capsule is provisionally formed in the primary memory to operate the data processing system and to make a message transmission related to the result of the processing.

When carrying out the process within the terminal station 101, if the desired object component does not exist within the terminal station 101 or the attribute or schema does not exist, a data transfer is received from another terminal station via the line 103 to incorporate the data within the terminal station 101 and carry out a learning process.

FIG. 12 shows the treatment of an object.

The object component 206 in the component attribute file 205 may be regarded as an assembly of user data in the user data database and metadata in the metadata database. In the conventional construction, of course, the database management system for managing the user data database and the data dictionary and directory system operate independently from each other. Further, the content of the user-data database and the content of the metadata database are accessed separately. In the system of FIG. 12, on the other hand, the real data 203 and the metadata 202 are connected with each other such that one can treat the data 203 and 202 as a single object component 206 that is specified by an object command.

It should be noted that there is a proposal to connect the individual user data or entity data on the user-data database and the metadata on the metadata database to form an object component.

The subject of the object component includes the smallest, primitive objects to the composite components such as the capsuled objects, event objects and the system objects. In other words, these composite objects tend to have an extremely complex nature associated with the complex composite process, such that there occurs a situation wherein no one knows the nature of the object except for the person who has created the object.

In order to deal with the difficulty arising from such a situation, it is desirable to provide a description, in the metadata, about the entity data in the form of the name or comments, or in the form of semantic data model, schematic flowchart, detailed flowchart, source program, and the like, such that a third person can understand the meaning thereof.

When doing so, however, the object components tend to have a large amount of information. Thus, it is desired to provide a designation to the object component such that the content of the object component is shown in a brief representation.

In the present invention, a designation is given to the object components about the content thereof such that one can access the object component by way of the designation.

Figure 13:
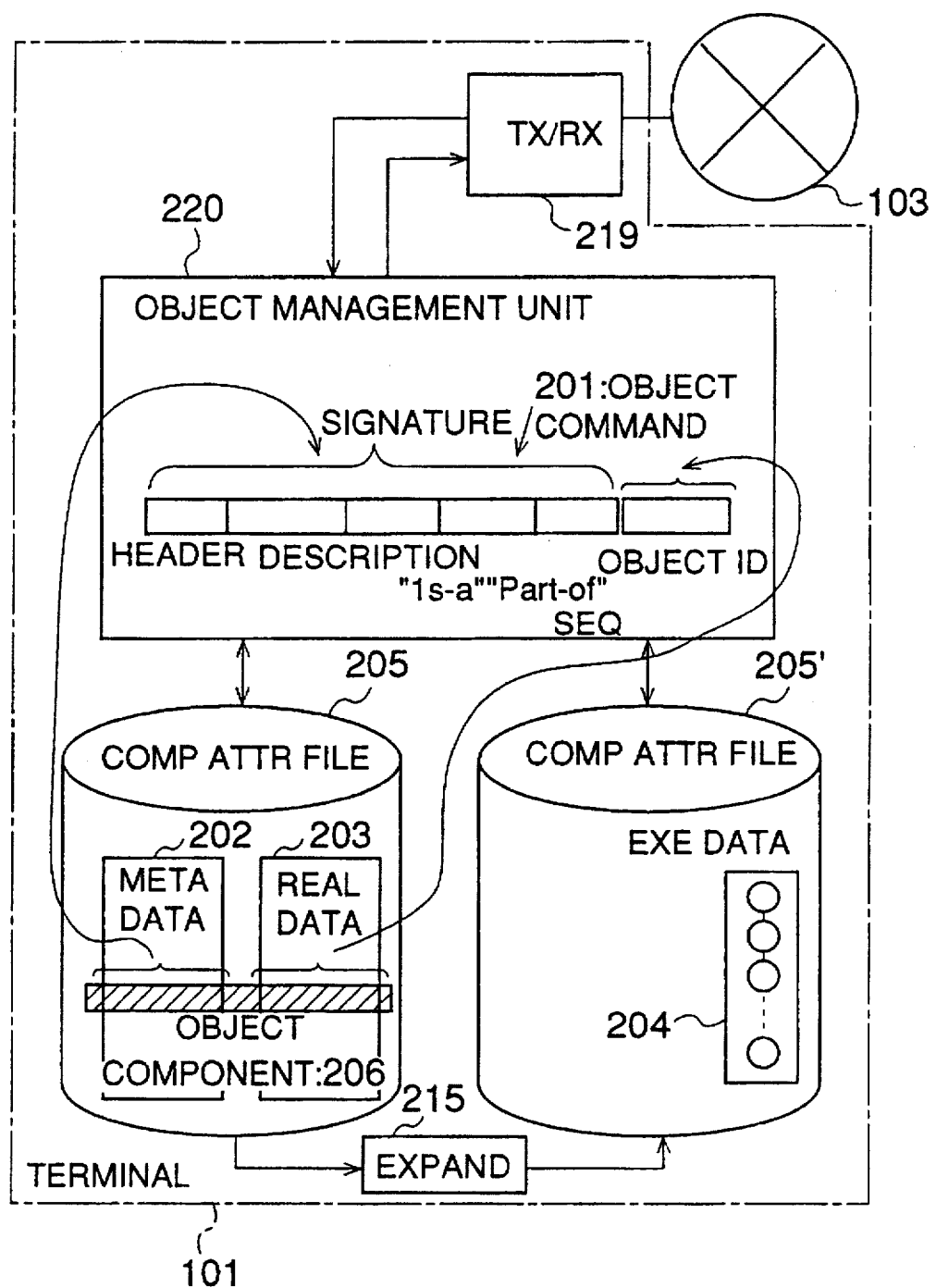
FIG. 13 is a diagram showing the construction for carrying out object management.

FIG. 13 shows the construction for carrying out the object management, wherein the data processing system of FIG. 13 forms a terminal 101. Further, a LAN or network 103 is connected to the terminal 101 for communication with other terminals.

The system of FIG. 13 further includes the metadata 202, the real data or entity data 203, the component attribute file 205, the object component 206, the transmission/reception unit 219, and the object management unit 220. Further, the system of FIG. 18 includes an object or combination of the objects as the executionable process data 214, wherein the executionable data 214 is expanded in the form suitable for execution of the actual operation processing. Further, there is provided the component attribute file 205' wherein the file 205' is identical with the component attribute file 205 and includes the executionable process data 214.

The system of FIG. 13 further includes the object command 201 wherein the object command 201 specifies the foregoing object component.

It should be noted that the object command 201 is formed of a signature (or sallogtate) and an object iD, wherein the signature is formed of the following elements.

(i) header area: Describes the location and length of the description to be explained below or the location and length of the description about the "is-a" hierarchy level, the "part-of" hierarchy level, and the sequence, in terms of bytes.

(ii) description area: Describes a summary of description of the object and contains the metadata in the compressed form. For example, the description area may include information such as "who made the object," "version number," and the like.

(iii) "is-a" hierarchy area: This area is used to represent the "is-a" hierarchical relationship. In the sentence "a dog is an animal," for example, "dog" is located in the lower hierarchy with respect to the hierarchy of "animal." Thus, the "is-a" hierarchy area indicates the situation that the lower hierarchy "dog" exits with respect to the upper hierarchy "animal."

(iv) "part-of" hierarchy area: This area is used to represent the "part-of" hierarchical relationship. For example, the "part-of" hierarchy area indicates that Arizona or California forms a hierarchy that forms a part of the United States.

(v) sequence area: A composite object is formed of a number of smaller objects. The sequence area is used to indicate the order of execution about these smaller objects including branching, in a compressed form.

(vi) object iD are: An object iD identical with the iD attached to the data in the conventional user-data database is described.

The object management unit 220 performs various functions such as creating a new object component 206 in the component attribute file 205, modifying or deleting existing object components, integrating a plurality of object components to form a single object, and dividing a single object component into a plurality of object components.

Additionally, the object management unit 220 communicates with a plurality of objects and sets the order of processing to the individual objects according to the processing demand.

In carrying out such various processing, the object management unit 220 specifies individual object in terms of the foregoing object command 201.

Further, the object management unit 220 carries out the compilation of individual objects according to the needs, to create the executionable process data 214, and the executionable process data 214 thus created is used in the data processing in the terminal 101 or in the communication Which is made between the terminal 101 and another terminal via the LAN or other communication network 103. As the executionable process data 214 is already compiled, the frequency of file accessing is reduced and the process speed is improved.

Figure 14A:
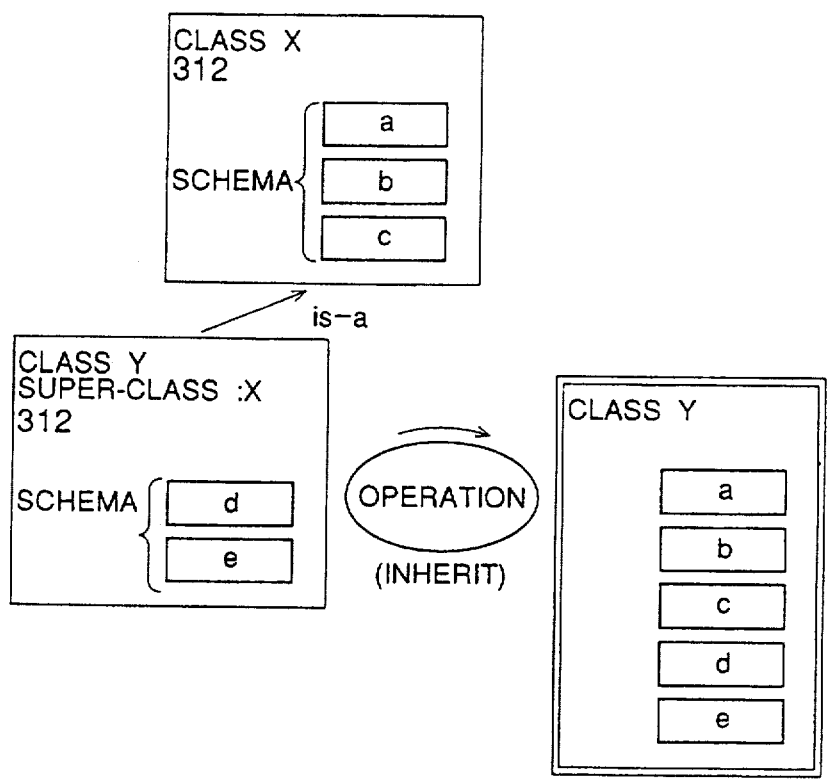
FIGS. 14A and 14B are diagrams for explaining the relationship between a plurality of classes.
Figure 14B:
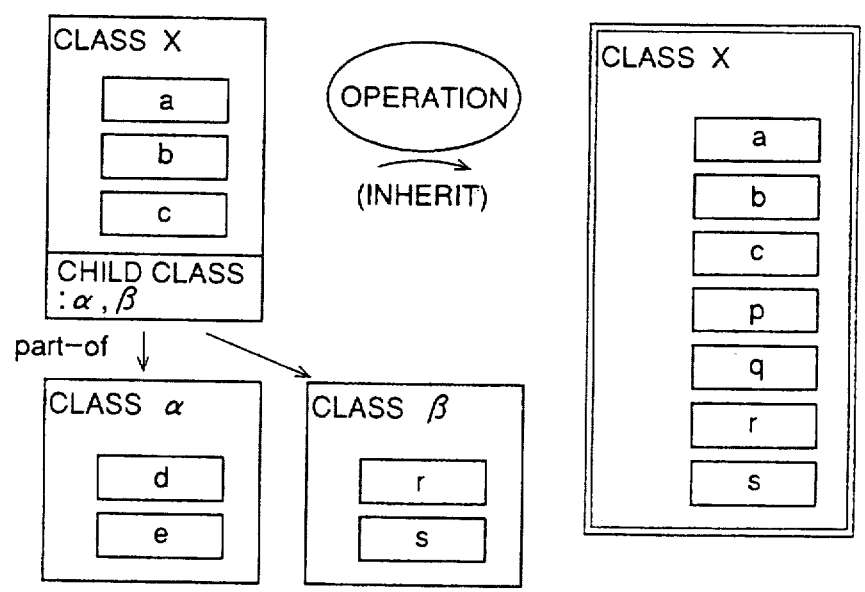

FIGS. 14A and 14B are diagrams for explaining the relationships among a plurality of classes.

FIG. 14A shows a case where a class Y has the "is-a" relationship to a class X. For example, the class X is a program related to "vehicle" and the class Y is a program related to "automobile".

In the case shown in FIG. 14A, methods a, b and c are introduced in relation to the class X, and methods d and e are introduced in relation to the class Y. In such a case, when an instruction specifies execution of the class Y, the methods a, b and c are inherited from the class X when executing the class Y, thereby executing a process based on the methods a, b, c, d and e.

FIG. 14B shows a case where classes α and β have the "part-of" relationship with respect to the class X. For example, the class X is a program related to "vehicle" and the classes α and β respectively are programs related to one of "chassis", "engine", "wheel" and the like.

In the case shown in FIG. 14B, methods a, b and c are introduced in relation to the class X, methods p and q are introduced in relation to the class α, and methods r and s are introduced in relation to the class β. In such a case, when an instruction specifies execution of the class X, a process is executed based on the methods a, b, c, p, q, r and s when executing the class X.

As described above, the present invention grasps the system tailored for a new demand in the form of classes and instances. As a result, the system can be freely designed with respect to the objective of the processing. Further, the system thus designed can be easily used later for other processing. When doing such a reuse of the system, it is necessary to take into account the causality explained with reference to FIG. 7.

Figure 15:
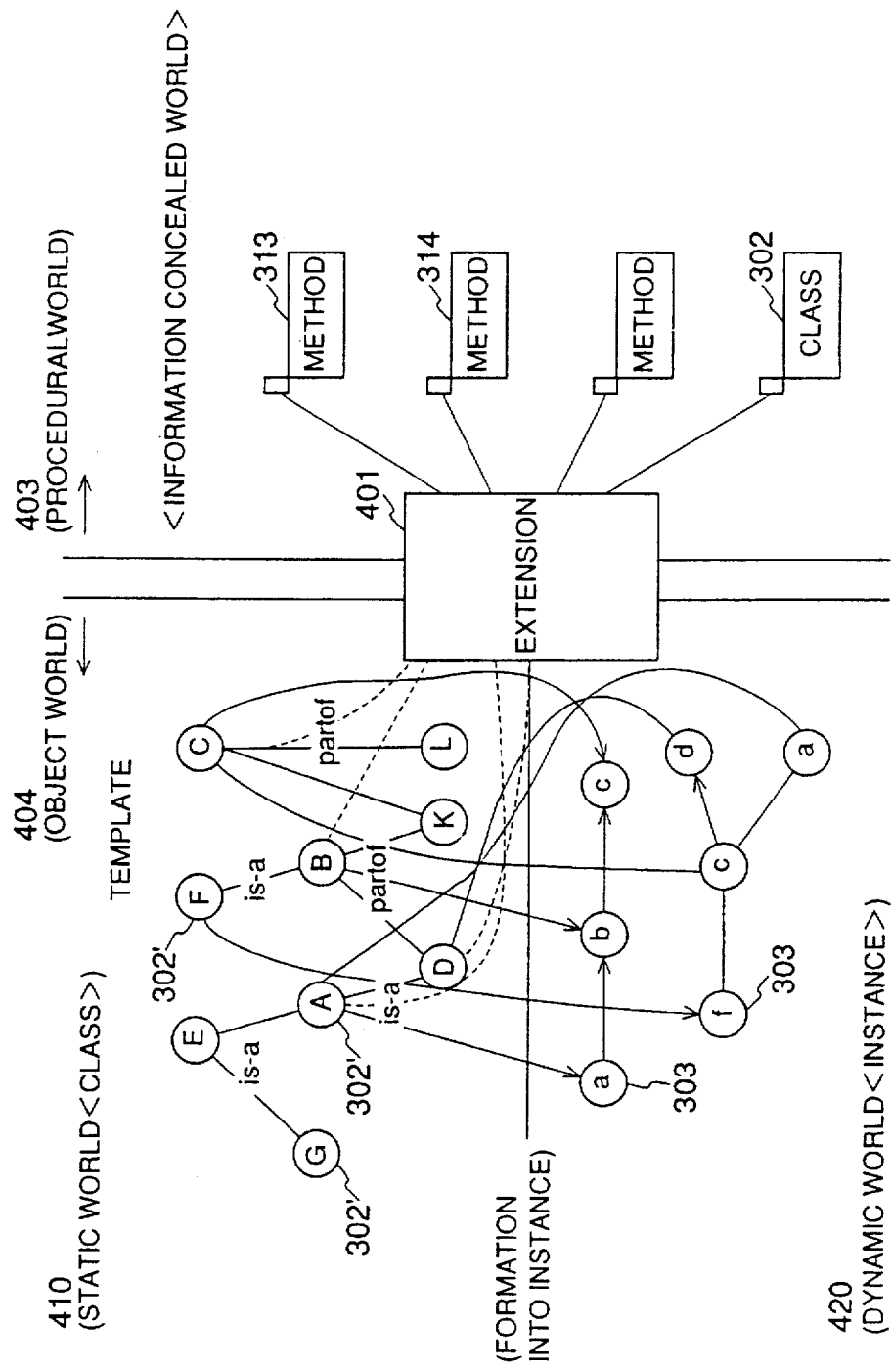
FIG. 15 is a diagram for explaining the execution of the processing.

FIG. 15 explains the execution of the processing, and shows an extension 401 which corresponds to the extension shown in FIG. 8, a procedural world 403 which corresponds to the connotation shown in FIG. 8, and an object world 404 which represents the model of the real world.

When forming the model of the real world (for example, the requested objective process), the present invention uses a static world 410 and a dynamic world 420. The static world 410 specifies the relationship among the classes and/or methods which are required to form the model. On the other hand, the dynamic world 420 specifies the time sequential relationship of the processes of the instances which are obtained when forming the model.

The classes and/or methods specified in the static world 410, and composite classes which are respectively obtained by adding or integrating the classes, are represented hereinafter by classes 302'.

The numeral 302 represent the class located in the procedural world 403, and the reference numeral 303 represent the instance, the reference numerals 313, 314, . . . represent the method.

The methods 313, 314, . . . are existing unit processes for respectively executing the individual processes. In order to execute a more complex process, a plurality of methods are introduced from the group of methods to form the class 302. Further, if necessary, a plurality of classes are introduced from the group of classes and a plurality of methods are introduced from the group of methods to form a composite class in order to execute a more complex process. Such classes 302 and the composite classes respectively correspond to one object unit.

It will be assumed for the sake of convenience that such methods and classes already exist.

For example, suppose that a user demands processing of an objective process for a certain kind of process. In the present invention, the classes and methods required to process the demanded process are introduced in order to process the demanded process, and the mutual relationships among the classes and methods are determined. The static world 410 describes information related to the mutual relationships. In the preset invention, the aforementioned strong link 500 and the weak link 501 are used to construct a system within an extent currently necessary or within an extent expected to become necessary in future.

In the case shown in FIG. 15, A, B, C, D, E, F, G, K and L are introduced as the classes 302' for the purpose of processing the objective process. (i) The classes G and A respectively have the "is-a" relationship with respect to the class E, (ii) the class D has the "is-a" relationship with respect to the class A, (iii) the class B has the "is-a" relationship with respect to the class F, (iv) the classes D and K respectively have the "part-of" relationship with respect to the class C, and (v) the classes K and L respectively have the "part-of" relationship with respect to the class C. Actually, the class 302' described in the static world 410 is given by use of an identification (ID) or identifier which is sufficient to point the class 302, the method 313 or the like existing in the procedural world 403.

The classes 302' have corresponding relationships to the classes and methods existing in the procedural world 403. In other words, the classes 302' are programs for executing the individual processes and are similar to formulas in mathematics, where it may be regarded that the values within the programs are given by general variables. The instances 303 are obtained by setting the instance data with respect to the general variables of the classes 302' and forming specific programs in which the individual instance data are assembled.

In the dynamic world 420, the processing time sequence of instances a, b, c, . . . corresponding to the classes 302' introduced in the static world 410 are specified, and the process requested by the user is executed.

As described above, if the user requests processing of a certain objective process, for example, the classes A, B, C, D, E, F, K and L are specified in the static world 410 as the classes 302' which are required for the processing of the objective process. In addition, the relationships such as "is-a" and "part-of" relationships are clarified among the classes 302'. Actually, a state table is prepared and the relationships are described in the state table. If restrictions exist among the classes 32' in respect of the causality, information related to such restrictions are also described in the state table.

When processing the objective process requested from the user, the introduced classes 302' are not used as they are. In other words, the instances 303 in which the individual instance data are set, are used with respect to the general variables within each of the classes 302'. In addition, the processing is made according to the time sequential relationship of each of the instances which are processed.

In the case shown in FIG. 15, the instance a corresponding to the class A, the instance b corresponding to the class B, the instance c corresponding to the class C, the instance d corresponding to the class D, and the instance f corresponding to the class F are generated. In addition, there are shown (i) a session in which the instances a, b and c advance in this sequence, and (ii) a session in which the instances f, c, d and a advance in this sequence.

When generating the instance a, the instance a is of course generated using the class A which corresponds to the formula. In this case, since the class A has the "is-a" relationship with respect to the class E, it is regarded that the contents indicated in the class E are inherited to the class A, and the instance a is generated using both the classes E and A.

On the other hand, since the classes D and K respectively have the "part-of" relationship with respect to the class B, the instance b is generated using the classes B, D and K.

When executing each session, the state table described above existing in the static world 410 is inspected and the start of execution of the instance a, for example is written into the state table when starting the execution of the instance a. When the processing of the instance a ends, this end is written into the state table. Hence, the restrictions corresponding to the causality existing in and described in the static world 410 are Written into the state table without omission. Of course, new restrictions may be generated, but the new restrictions can be given in correspondence with each of the sessions. However, the causality generated when the classes 302' are introduced and related in the static world 410 are described in the static world 410, and is inherited to the processing of the session in the dynamic world 420.

Figure 16:
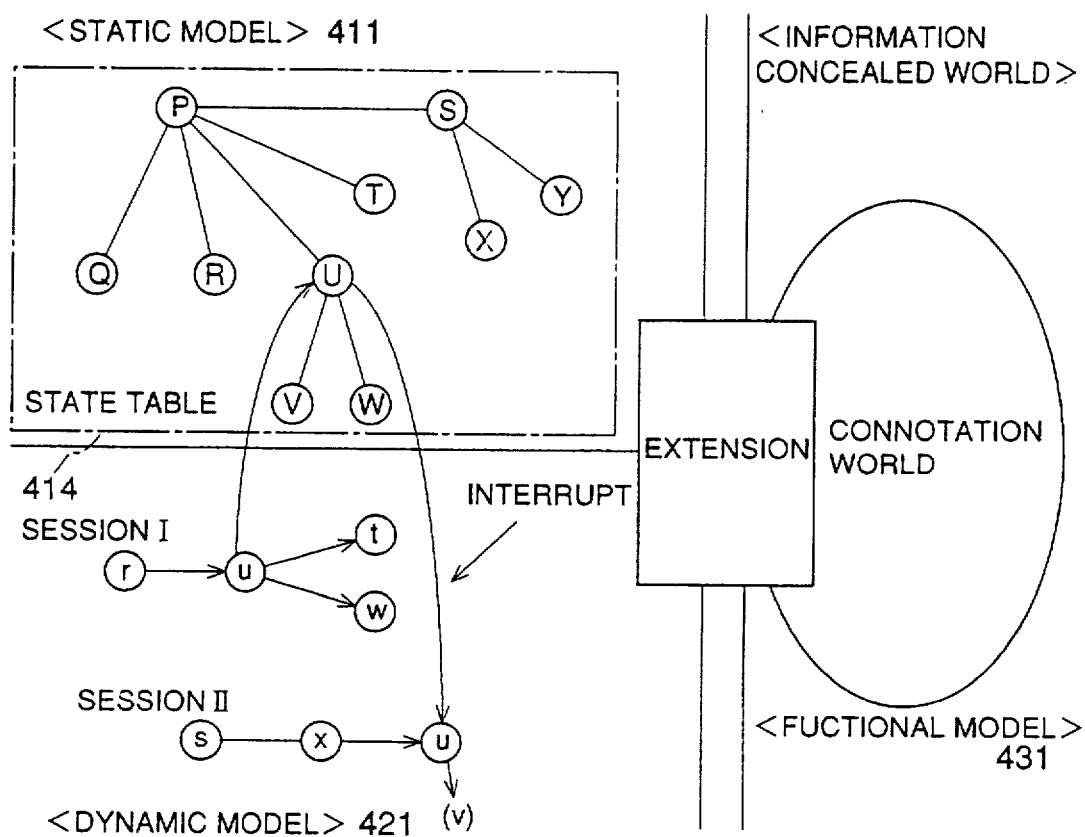
FIG. 16 is a diagram for explaining the mode of incorporating causality when executing a session.

FIG. 16 is a diagram for explaining the introduction of causality when executing a session. In FIG. 16, an element 414 indicates the same state table as that shown in FIG. 7.

In the case shown in FIG. 16, it is indicated that classes P through Y are incorporated as the information within the state table 414 for a certain process. The classes Q, R, S, T and U exist under the class P, the classes X and Y exist under the class S, and the classes V and W exist under the class U. In addition, instances r, u, t, w, s and x are generated and the session is assembled.

A session I and a session II are executed under the dynamic model 421. However, during the time when the individual instances such as the instance u carries out its own process, it is unnecessary to take into consideration the causality with other instances. For example, the content of the state table 414 is checked at the time when the instance u starts its own process, and the process is executed after checking whether or not no violation is made with respect to the restrictions of the causality. It is sufficient to report the causality to the state table 414 at the time when the process of the instance u is ended.

In a case where, as a result of executing the instance u in the session I, it becomes necessary to execute another instance v instead of executing the instance u in the session II, a branch is made to the instance v by making an interrupt to the instance u of the session II based on the execution end report of the instance u of the session I. Alternatively, the dynamic model 421 is notified of the above when starting the instance u of the session II.

In the foregoing object-oriented data processing system, it has been assumed that the classes are linked according to the "is-a" relationship or "part-of" relationship. However, the relationship existing between the classes is not limited to the foregoing "is-a" relationship or "part-of" relationship.

FIG. 17–22 indicate examples of the relationship existing between classes in a static model.

Figure 17:
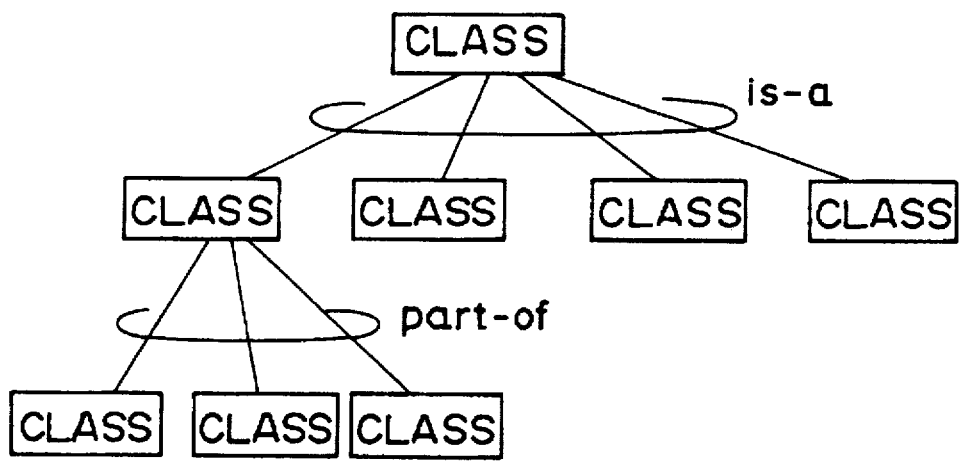
FIGS. 17–24 show various examples of link.

FIG. 17 shows a case wherein the classes are linked by the "is-a" relationship or "part-of" relationship.

Figure 18:
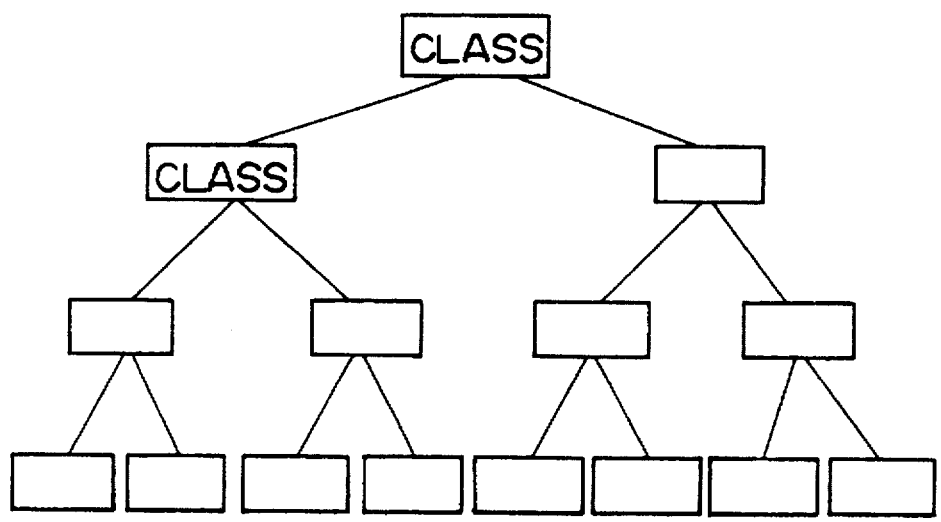

FIG. 18 shows a case wherein the classes are linked by a hierarchical link to form a tree-structure link. In the example of FIG. 18, it should be noted that the upper hierarchical class is uniquely determined from the lower hierarchical class.

Figure 19:
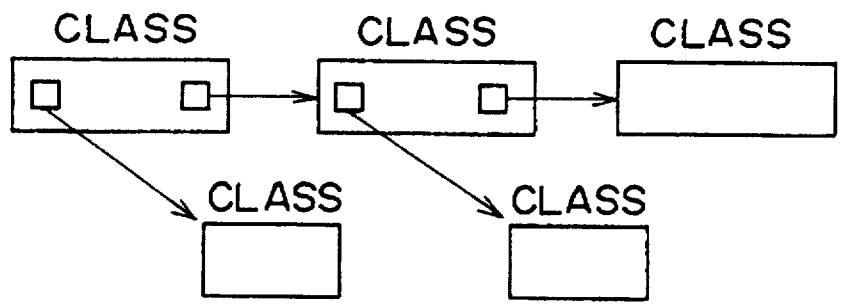

FIG. 19 shows a case wherein the classes are connected by a hyperlink to form a nest structure.

Figure 20:

FIG. 20 shows a case of operational link, wherein the result of operation between a class and another class creates a new class.

Figure 21:
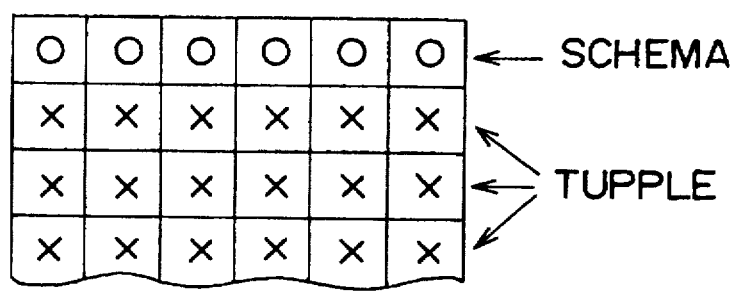

FIG. 21 shows a relational link wherein there are provided tupples in correspondence to a plurality of schema, such that the schema corresponds to the class and the tupple corresponds to the schema.

Figure 22:
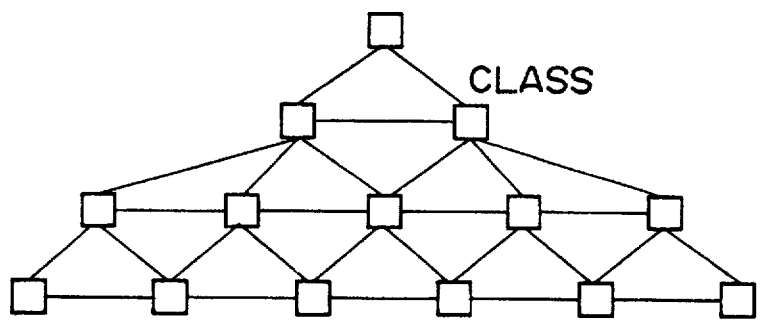

FIG. 22 shows a network link, a typical example is the CODASYL type link.

Figure 23:
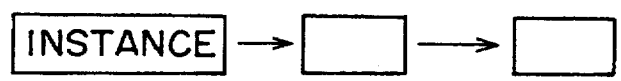
Figure 24:
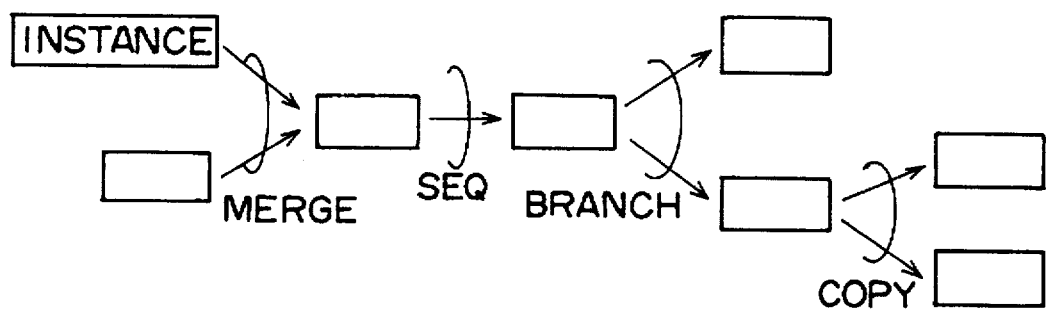
Figure 25:
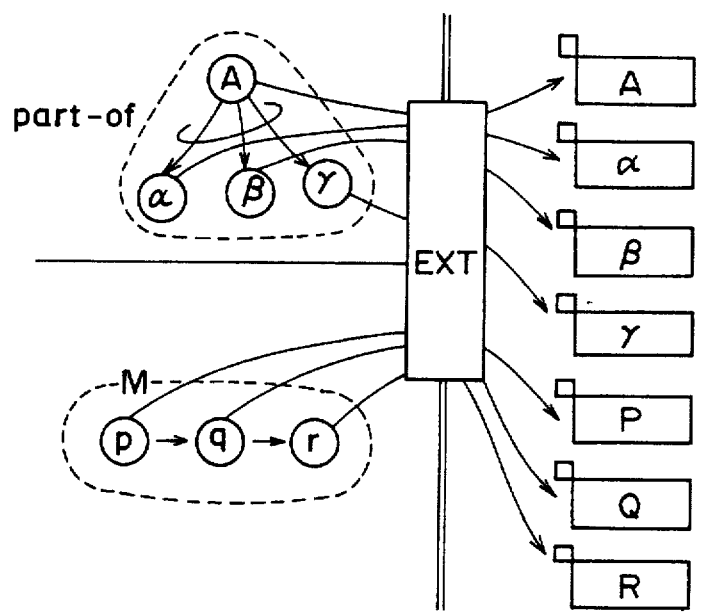
FIG. 25 is a diagram showing the creation of composite classes.

FIGS. 23 and 24 show an example of the relationship between the instances in a dynamic model.

Referring to FIG. 23 showing a sequence link, it will be noted that the development of events occurs in the form of flow.

FIG. 24 shows an example of branching, merging, copying and linking, wherein the development of event occurs by causing merging, branching, copying, and the like, as illustrated. A scenario is constructed by combining such "merging," "branching," "copying," and "sequencing".

The examples listed above are limited to the links used in the static model only or to the links used in the dynamic only. On the other hand, there exists links that relate to both of the static model and the dynamic model.

(i) object link . . . In the object link, the methods (programs) that are related to a class as an attribute are linked, in correspondence to the classes in the static model. Further, the data needed by an instance are linked, in correspondence to the instances in the dynamic model.

(ii) atmospheric link or situation link . . . The atmospheric link or situation link reduces the extent of information inheritance, in the classes forming a static model, based upon the state of the system in the dynamic model. The link forms a weak link.

(iii) inspiration link . . . The inspiration link is a link that relates, within a static model, the commands related to those commands used in a dynamic model, according to the association. The inspiration link forms a weak link.

(iv) cognition link . . . The cognition link is a link that expects the linkage of classes in a static model based upon the command used in a dynamic mode, such that a linkage matching to the desired processing is obtained.

(v) new-inference link . . . The new-inference link is a link that expects the linkage of classes in a static model while performing inference in the static model such that a linkage matching to the desired processing is obtained. The new-inference link is a weak link.

In an object oriented-database, objects such as A, $\alpha$, $\beta$, $\gamma$, P, Q, R, and the like, form together in the field of static model, a composite object that uses the objects A, $\alpha$, $\beta$ and $\gamma$ by incorporating the objects $\alpha$, $\beta$ and $\gamma$. Further, the instances p, q and r are connected in the field of dynamic model by a sequence link in relation to the objects P, Q and R, to form a session.

Figure 26:
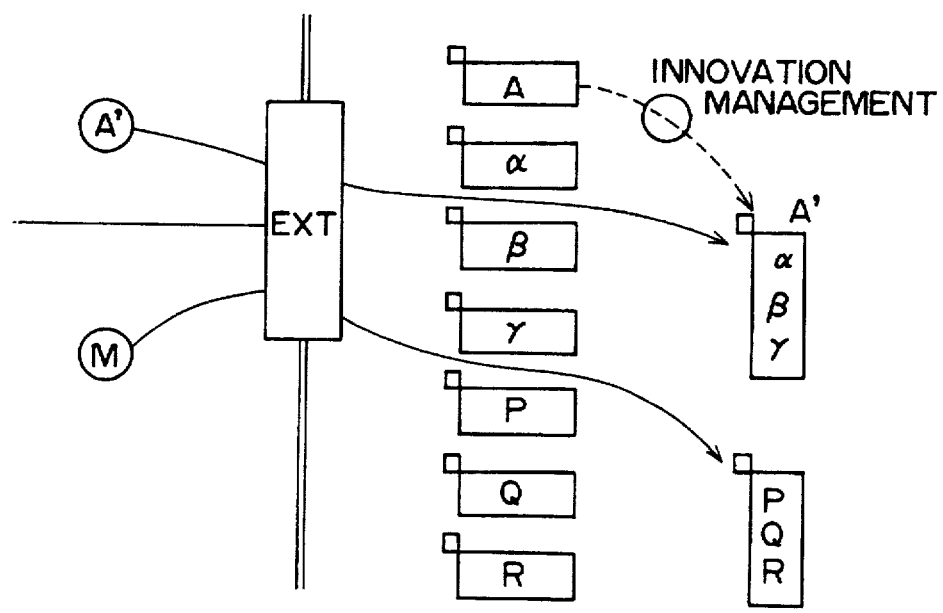
FIG. 26 is a diagram showing the creation of functional components in the concealed world.

When a composite class A' and a composite instance M are formed as indicated in FIG. 26 by combining the objects, a functional model of ($\alpha$, $\beta$, $\gamma$) is created in correspondence to the class A' and stored in the concealed world. Similarly, a functional model of (P, Q, R) is created in correspondence to the composite instance M and stored in the concealed world.

In the case when there exists a "part-of" relationship between the object A and the objects α, β and γ, the appearance of the original class A and the composite class A' may be different. However, the function of these objects is identical and the object A and the object A' should be managed by an innovation management process.

Figure 27:
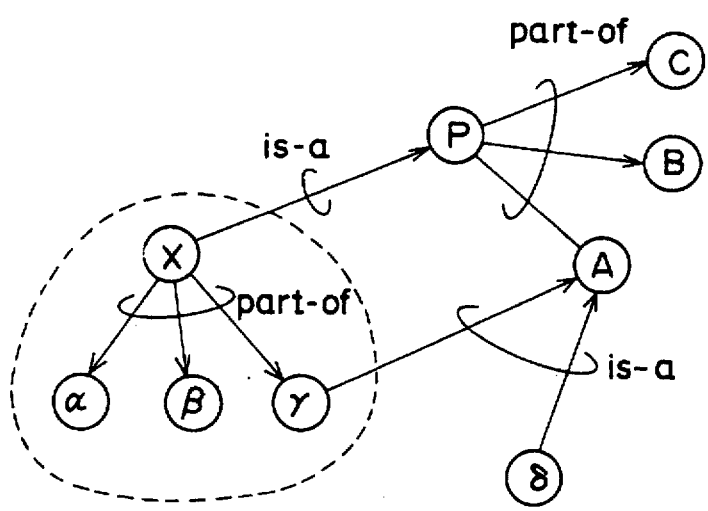
FIGS. 27 and 28 are diagrams showing the examples of link.

FIG. 27 shows an example wherein a plurality of objects are related with each other in a static model. In the illustrated example, it will be noted that (i) classes α, β and γ are linked to a class X (forming an object) by the "part-of" relationship, (ii) the class X is linked to the class P by the "is-a" relationship, (iii) the classes A, B and C are linked to the class P according to the "part-of" relationship, and (iv) the classes γ and δ are related to the class A according to the "is-a" relationship.

When a link as shown in FIG. 27 is set in the field of static model, an event ignition occurred in the class α activates a propagation of the operation for the class α, from the class α to the class X, from the class X to the class α, β and γ that are related to the class X by the "part-of" relationship, from the class X to the class P related to the class X by the "is-a" relationship, from the class P to the classes A, B and C that are related to the class P according to the "part-of relationship, and from the class " to the class A. In such a propagation of the operation, the inheritance of information is achieved between the related classes.

Thus, (i) the attribute of the class A is inherited to the class τ, (ii) the attribute of the classes A, B, C is inherited to the class P, (iii) the attribute of the class P is inherited to the class X, (iv) the attribute of the classes α, β and γ is inherited to the class X, and (v) the attribute of the class X is inherited to the class α.

In the normal situation wherein the links shown in FIG. 27 exist, the inheritance of information is achieved as described above. On the other hand, when the classes α, β and γ under the class X are assembled to form a single composite object (including a composite class), the inheritance of information occurs as follows.

The classes α, β and γ that are related to the class X according to the "part-of" relationship, form a composite object X', wherein the internal definition of the composite object X' is held in the concealed world as a unitary assembly.

When causing inheritance of information shown in FIG. 27 under the state that the composite object X' is formed, it is necessary to inherit She attribute of the class A to the class γ when the class γ itself is applied with a process. However, in the case that the composite object X' is applied with a process, it is desired to selectively cause inheritance of attribute of the class A to the class X' depending upon the situation of processing or state of the system. In order to construct a realistic processing system, it is desired that such a selective inheritance is possible.

Figure 28:
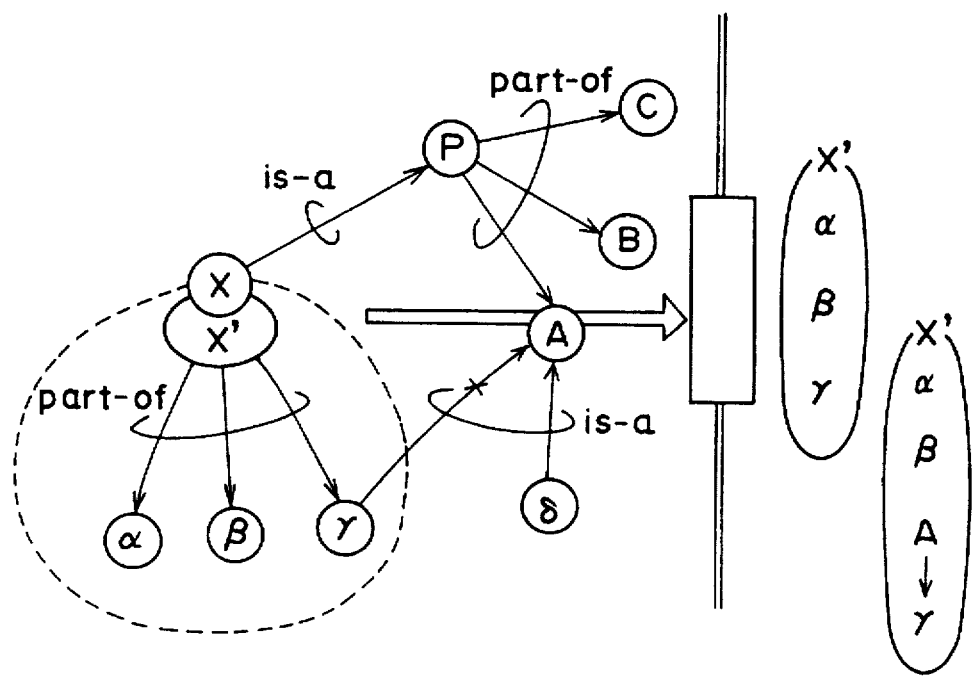

In the present invention, two types of link, a strong link and a weak link, are considered between the class γ and the class A shown in FIG. 28. Of course, the strong link and the weak link are not limited to the link connecting the class γ and class A shown in FIG. 28 but may appear between any two classes.

In the strong link, the attribute of the upper class such as the class A is always inherited when the class γ is subjected to a process. On the other hand, a weak link provides opportunity to select whether or not the attribute of the class A is to be inherited when the class γ is subjected to processing.

When a strong link is set, a procedure X' for inheriting the attribute of the class A to the class γ (α, β, A→τ) exists in the concealed, procedural world. In the case wherein a weak link is set, the procedural world includes the procedure X' (α, β, γ) that does not cause the inheritance of the attribute of the class A to the class γ.

Figure 29:
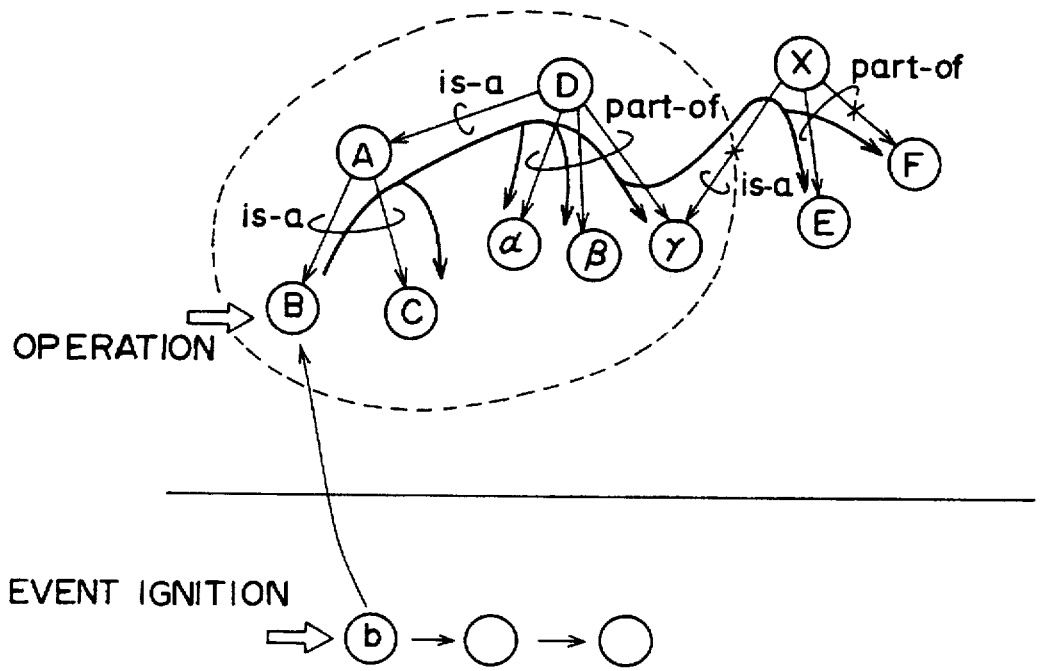
FIG. 29 is a diagram for explaining the propagation of operation.

FIG. 29 explains the propagation of the operation, wherein it is assumed that the field of a static model includes classes A, B, C, α, β, τ, X, E and F connected by a link as illustrated. In this case, an operation applied to the class B causes a propagation, as described with reference to FIG. 7, such that (a) an inheritance of upper classes occurs upon operation of lower classes under the existence of the "is-a" relationship; and (b) an inheritance of lower classes occurs upon operation of upper classes under the existence of the "part-of" relationship.

Thus, the inheritance of operation occurs as indicated by a thick line in FIG. 29, and associated therewith, an inheritance of information occurs.

In the event that a weak link is set between the class γ and the class X or between the class X and the class F, as indicated in FIG. 29 by a cross mark, such that the weak link disconnects the connection of the classes, the inheritance of the attribute of the class X to the class γ is no longer necessary, and the inheritance of information occurs only in the limited region encircled by a broken line in FIG. 29 and designated as "propagation of operation."

The connection by means of the aforementioned weak link is useful for limiting the extent of the region in which information inheritance occurs. The use of such a weak link is extremely advantageous from the practical view point.

Figure 30:
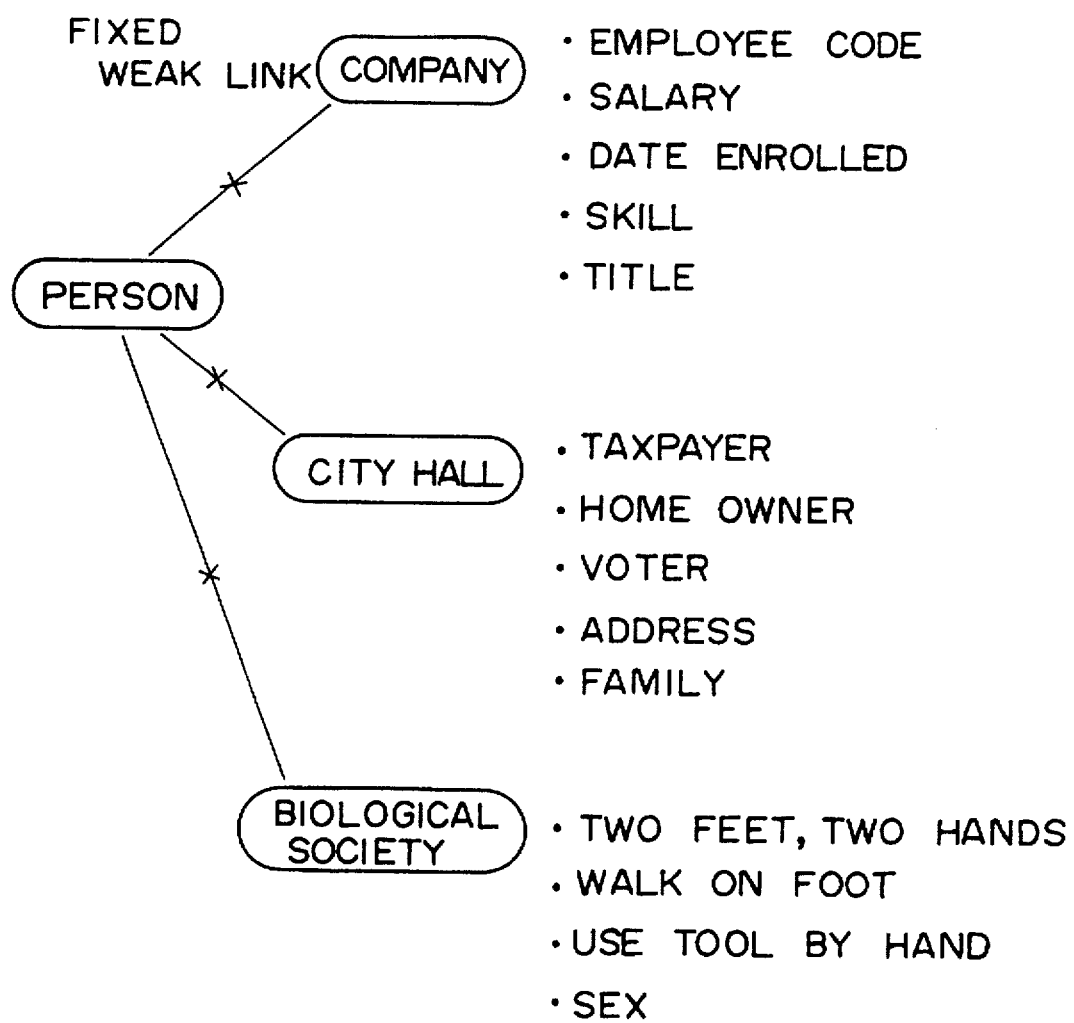
FIG. 30 is a diagram showing an example of the fixed weak link.

FIG. 30 shows an example of fixed weak link, wherein it is assumed that there exists an object "person" such that the object "person" is linked to an object "company", object "city hall," or object "biological society."

When conducting a processing related to the company in which the person is employed under the existence of the link shown in FIG. 30, it is sufficient to connect the class "person" to the "class company." The information used in such a processing includes "employee code," "salary," "date of joining the company," "skill level," "title," and the like, while information related to the city hall such as "taxpayer," "home owner," "voter," and the like, are unnecessary. Similarly, information related to the "biological society" such as "the person has two feet and two hand," or "the person walks on foot," and the like, are not necessary.

This it is practical to set a weak link between the class "person" and the class "company," between the class "person" and the class "city hall," and between the class "person" and the class "biological society," such that the weak link can be changed to the strong link as necessary. Particularly, the case of FIG. 30 wherein the class that is connected to the class "person" by the weak link is already known, is called a "fixed weak link," as the location of setting the weak link is given in advance.

Figure 31:
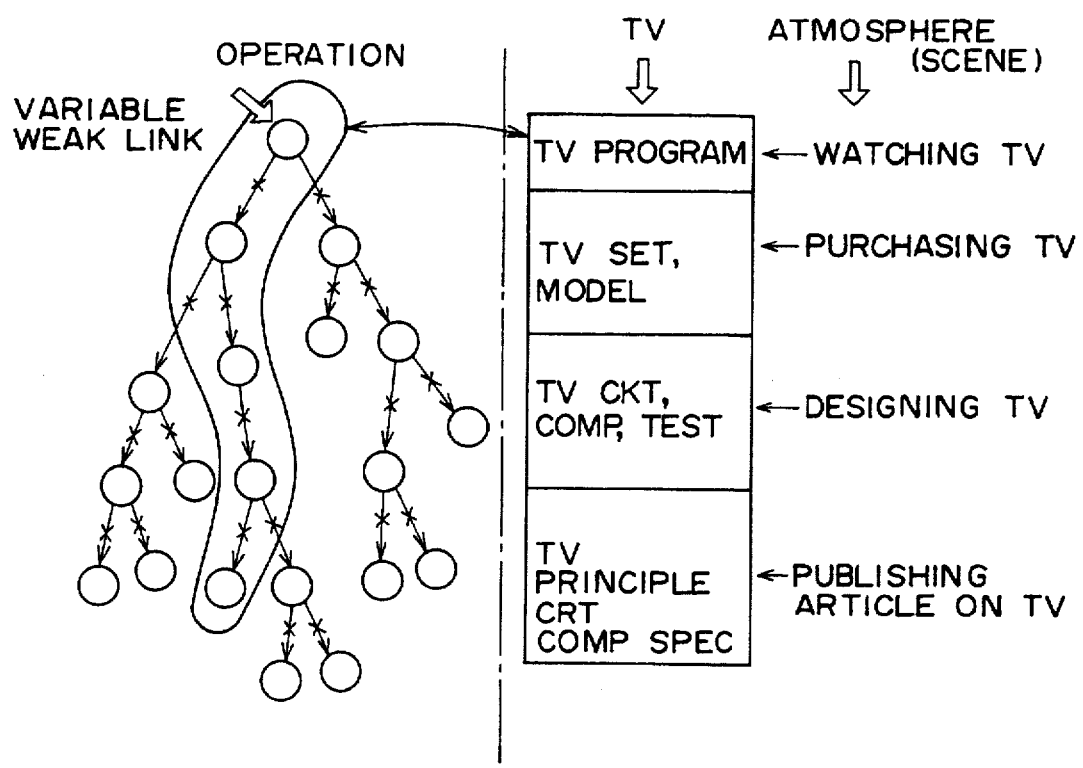
FIG. 31 is a diagram showing an example of the variable weak link.

FIG. 31 shows an example of using a variable weak link, wherein it is assumed that a link related to "TV" exists at the left side of one-dotted chain shown in FIG. 31. It is assumed that the link is set to every objects related to the television.

When conducting a processing under the existence of such a link, it is desirable to modify the extent in which the inheritance of information occurs according to the processing such as (i) processing related to watching a TV;

(ii) processing related to buying a TV;

(iii) processing related to designing a TV;
(iv) processing related to submitting an article about TV, and the like.

Thus, the processing related to "watching a TV" is conducted by setting the "variable weak link," such that classes focusing upon "watching a TV program" are connected. As a result, the extent in which the inheritance of information occurs, is limited to the area encircled in FIG. 31. When "submitting an article about TV," the link is set to connect classes focusing the subject of "principle of TV," "performance of CRT," and the like. Such a weak link is changed according to the needs based upon the "atmosphere" that changed time to time. Thus, such a weak link may be called "atmospheric link."

The variable weak link is modified freely according to the needs. Thus, it is possible to connect the class "person" and the class "city hall" temporarily while conducting a processing by connecting the class "person" and the class "company," to incorporate the information related to the class "city hall" such as "address" or "family." Such a search of information may be called "hypersearch" Further, the example of FIG. 24 can develop an inference processing by combining a class such as "image processing" to a class "facsimile technology," and further combining thereto classes such as "movie technology" or "laser technology." Such an inference processing may be called new-inference.

Figure 32:
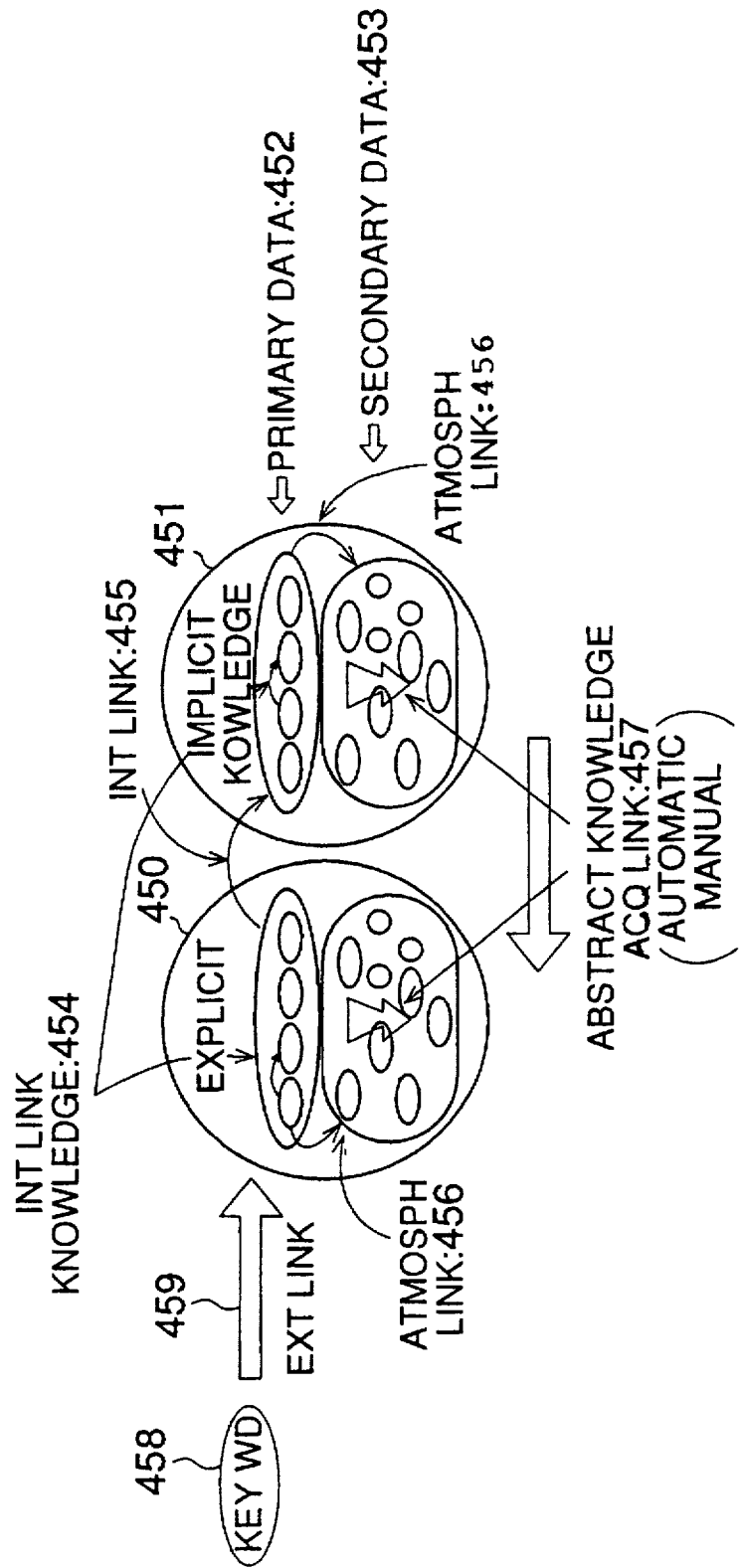
FIG. 32 is a diagram for representing the process of knowledge data extraction conceptually.

FIG. 32 shows the procedure of extracting knowledge data schematically. FIG. 32 includes explicit knowledge data 450, implicit knowledge data 451, primary data 452, secondary data 453, an internal link 454 within the same knowledge data, another internal link 455 extending from the explicit knowledge data 450 to the implicit knowledge data 451, an atmospheric link 456, an abstract structural knowledge acquisition link 457 that indicates the mode of knowledge acquisition in each of the secondary data 453, a keyword 458, and an external link 459.

It is believed that FIG. 32 models the human process of extracting knowledge data.

The knowledge data is divided into the explicit knowledge data 450 and the implicit knowledge data 451, wherein each of the data 450 and 451 contains the primary data 452 corresponding to the superficial knowledge and the secondary data 453 corresponding to the knowledge that are held in a black box. Thus, the primary data 452 indicates the direct projection of the real world, while the secondary data is the data that is obtained according to the abstract structural analysis.

In the actual data processing system, the data existing in the own terminal node may be regarded as the explicit knowledge data 450 while the data existing in the other terminal node may be regarded as the implicit knowledge data 451.

The data elements in the same knowledge data are linked by the internal link 454, while the internal link 455 links the implicit knowledge data. Further, there exists the perception link 456 that links the primary data and the secondary data. It should be noted that a person who has obtained the implicit knowledge data experiences the "cognition." When the cognition occurs, the implicit knowledge data is transferred to the explicit knowledge data gradually, and the person obtains the "inspiration." The reason that the link 456 is designated as atmospheric link is that the primary data 452 and the secondary data 453 are linked by the insight or association that tends to change each time depending upon one's atmosphere.

The process for extracting the knowledge data shown in FIG. 32 is started by accessing the primary data 452 in the explicit data 450. Then, the mode of knowledge acquisition expands from the primary data 452 via the internal link 454 that links within the same knowledge data. Further, the mode of knowledge acquisition reaches the implicit knowledge data 451 via the internal link 455 that links the implicit knowledge data. Further, there may be a case wherein the mode of knowledge acquisition reaches the secondary data 453 via the atmospheric link 456.

It should be noted that such an accessing from the explicit knowledge data 450 to the implicit knowledge data 451 corresponds to the communication with other terminal via the LAN or other network 103 in the system of FIG. 11 or FIG. 12. Further, the mode of acquiring the primary data 452 or secondary data 453 in the explicit knowledge data 450 or in the implicit knowledge data 451, corresponds to the processing shown in FIGS. 7–24 or to the atmospheric link 456 shown in FIG. 32.

Further, the present invention is not limited to the embodiments described heretofore, but various variations and modifications may be made without departing from the scope of the invention.

What is claimed is:

1. An object-oriented data processing system for performing a desired processing based upon an object model, said object model including a plurality of objects combined with each other, each of said objects being formed of data and methods, said object-oriented data processing system comprising:

an external definition provided for each of said objects for identifying said object, said external definition including an identifier that identifies said object;

an internal definition provided for each of said objects for carrying out a procedure of said object, said internal definition including an identifier corresponding to said identifier in said external definition for the object;

model classification means for classifying said object model, based upon said external definition, into a static model indicating a relationship between classes, and a dynamic model indicating a time sequential relationship between instances of classes as a session the session providing a motion of said dynamic model;

class generation means for creating classes by combining one of an existing and newly created method with one of a existing and newly created method, said class including a composite class formed of a plurality of classes;

instance generation means for creating instances in correspondence to each of said classes;

said existing methods, said newly created methods, said class and said composite class, and said session being stored in a concealed area corresponding to said internal definition as a functional model such that each object is related to said identifier;

link setting means for setting a link between said plurality of objects forming said static model and dynamic model to provide a structure to said static model and said dynamic model;

said link being selected from a strong link that causes a propagation of operation applied to an object, to another object connected by said strong link; and a weak link connecting an object to another object such that propagation of an operation applied to the object does not occur to said other object that is connected thereto by the weak link;

said link setting means conditionally converting a weak link to a strong link;

said link setting means thereby setting a range of propagation of operation, when executing a processing upon construction of said class, composite class, and said instance, in according to a type of said link.

2. An object-oriented data processing system as claimed in claim 1, wherein said link setting means converts said weak link temporality and reversibly to a strong link.

3. An object-oriented data processing system as claimed in claim 1, wherein said link setting means converts said weak link permanently to a strong link.

4. An object-oriented data processing system as claimed in claim 1, wherein said link setting means sets said weak link between related objects as a fixed weak link and a variable weak link, said fixed weak link being always converted to a strong link when conducting a processing, said variable weak link being converted to a strong link as necessary depending upon each processing step.

* * * * *

UNITED STATES PATENT AND TRADEMARK OFFICE
CERTIFICATE OF CORRECTION

PATENT NO. : 5,560,012

DATED : September 24, 1996

INVENTOR(S) : Tadamitsu Ryu, et. al.

It is certified that error appears in the above-indentified patent and that said Letters Patent is hereby corrected as shown below:

Column 3, line 42, after "by" delete "!".

Column 4, line 48, delete "Upon" and insert -- upon --.

Column 7:
    Line 13, change "414" to -- 414 -- (bold numbers).
    Line 17, change the second occurrence of "a" to -- <u>a</u> --.
    Line 19, change "b" to -- <u>b</u> --.

Column 15, line 25 delete "Written" and insert -- written --.

Column 20, line 18 of Claim 1, after "session" insert -- , --.

Signed and Sealed this

Twenty-seventh Day of May, 1997

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,560,012

DATED : September 24, 1996

INVENTOR(S) : Tadamitsu Ryu, et. al.

It is certified that error appears in the above-indentified patent and that said Letters Patent is hereby corrected as shown below:

Column 17, line 29, delete "T" and insert -- Y --.

Column 18:
    Line 2, delete "T" and insert -- Y --.
    Line 9, delete "T" and insert -- Y --.

Signed and Sealed this

First Day of July, 1997

Attest:

BRUCE LEHMAN

*Attesting Officer*      *Commissioner of Patents and Trademarks*